US007823054B2

(12) United States Patent  (10) Patent No.: US 7,823,054 B2
Forstall et al.  (45) Date of Patent: Oct. 26, 2010

(54) SNAPBACK USER INTERFACE FOR ACCESSING DIFFERENT DOCUMENT PAGES DIRECTLY WITHOUT GOING THROUGH INTERMEDIATE PAGES

(75) Inventors: Scott Forstall, Mountain View, CA (US); Donald Dale Melton, San Carlos, CA (US); John William Sullivan, Pacific Grove, CA (US)

(73) Assignee: Apple Inc., Cupertino, CA (US)

( * ) Notice: Subject to any disclaimer, the term of this patent is extended or adjusted under 35 U.S.C. 154(b) by 978 days.

(21) Appl. No.: 11/644,162

(22) Filed: Dec. 21, 2006

(65) Prior Publication Data

US 2007/0106953 A1  May 10, 2007

Related U.S. Application Data

(63) Continuation of application No. 11/496,834, filed on Jul. 31, 2006, which is a continuation of application No. 10/337,768, filed on Jan. 6, 2003, now Pat. No. 7,581,164.

(51) Int. Cl.
    *G06F 17/00* (2006.01)
(52) U.S. Cl. .................. 715/200; 707/706; 715/840
(58) Field of Classification Search .................. 715/200, 715/840; 707/706
    See application file for complete search history.

(56) References Cited

U.S. PATENT DOCUMENTS

| 5,727,129 | A  |   | 3/1998  | Barrett et al.           |
|-----------|----|---|---------|--------------------------|
| 5,854,630 | A  |   | 12/1998 | Nielsen                  |
| 6,189,024 | B1 |   | 2/2001  | Bauersfeld et al.        |
| 6,460,060 | B1 | * | 10/2002 | Maddalozzo et al. ... 715/234 |
| 6,636,853 | B1 | * | 10/2003 | Stephens, Jr. ........... 1/1 |
| 6,820,111 | B1 |   | 11/2004 | Rubin et al.             |
| 6,948,135 | B1 |   | 9/2005  | Ruthfield et al.         |
| 2004/0236774 | A1 |  | 11/2004 | Baird et al.             |

OTHER PUBLICATIONS

Bharat, "SearchPad: explicit capture of search context to support Web search", Computer Networks 33, p. 493-501, copyright 2000, Elsevier Science.*

(Continued)

*Primary Examiner*—Amelia Rutledge
(74) *Attorney, Agent, or Firm*—Blakely, Sokoloff, Taylor & Zafman LLP

(57) ABSTRACT

A user interface and methods for accessing document presentations are described herein. In one aspect of the invention, an exemplary method of the invention allows a user to directly snapback to a previous accessed document presentation without having to select from a menu of items or go through the intermediate pages. In this method, when a first document presentation is accessed, a first location of the first document presentation is recorded, automatically or manually. Subsequently, when a sequence of additional document presentations originated from the first document presentation is accessed, in response to a first input, without having to select from a menu of items, the first document presentation is directly retrieved from a recorded first location and displayed in a window. In one particular embodiment, a second document presentation is accessed and a second location of the second document presentation is recorded, where the recordation of the second location resets or supercedes the recordation of the first location. Other methods and apparatuses are also described.

20 Claims, 33 Drawing Sheets

OTHER PUBLICATIONS

PCT Search Report for PCT International Appln No. US2004/000261, mailed Nov. 18, 2004 (10 pages).

Greenberg, et al., "Getting Back to Back: Alternate Behaviors for a Web Brower's Back Button", Proceeding of the 5th Annual Human Factors and the Web Conference, NIST, Maryland, USA Jun. 1999, pp. 1-7.

Brown, et al., "DeckScape: an experimental Web browser", Computer Networks and ISDN Systems 27, published 1995, pp. 1097-1104.

Newfield, et al., "Scratchpad: Mechanisms for Better Navigation in Directed Web Seaching", Proceedings of the Symposium on User Interface Software and Technology, 1998, pp. 1-8.

Tauscher, et al., "How people revisit web pages: empirical findings and implications for the design of history systems", Abstract, pp. 1-2, of published article from International Journal of Human-Computer Studies, vol. 7, Issue 1, Jul. 1997.

* cited by examiner

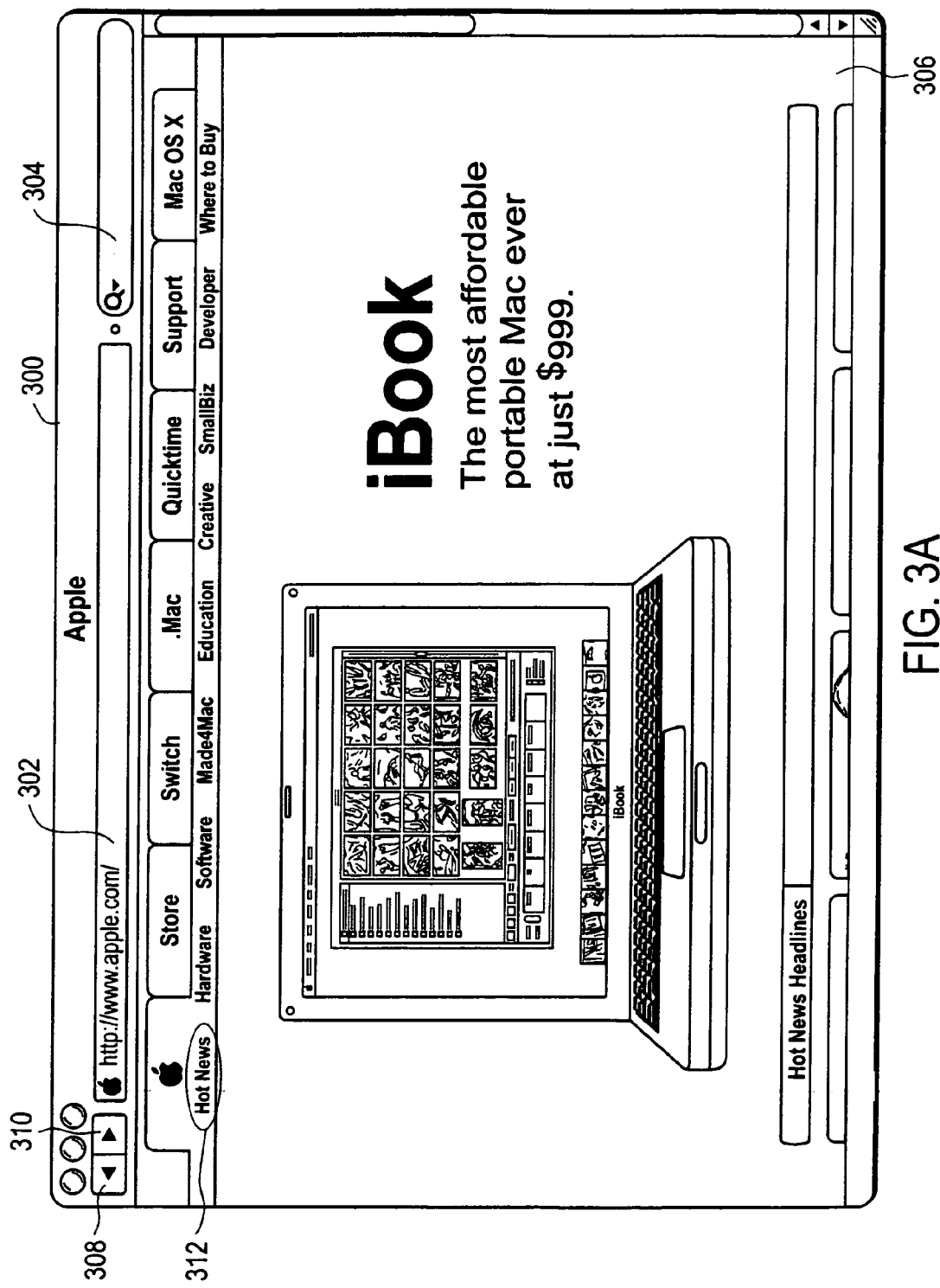

FIG. 5B

Alligators and their kin

The American Alligator (Alligator mississippiensis) is just one type of large reptiles belonging to the family Crocodylidae. The history of the crocodilians dates back to the Triassic period, some 230 million years ago. Alligators and their kin are modern dinosaurs, having existed virtually unchanged for the past 65 million years. The crocodilians can be broken into four main groups, the alligators, caimans, crocodiles, and gharials.

The alligator is found only in the southeastern United States and in China. Alligators have a short, blunt and rounded snout. Adults tend to be a grayish black in color while the young can be more colorful with yellow or white highlights on a black body. The Chinese alligator is quite small, only attaining a length of 6 feet. The American Alligator however is quite large, with a record length of 19' 2". Fortunately, the American Alligator is not considered to be a man-eater. In the wild, alligators tend to exhibit a natural fear of man.

Caimans are found primarily in Central and South America. There are many types of caiman, the most "popular" being the spectacled caiman (Caiman sclerops). This reptile

FIG. 9B

SNAPBACK USER INTERFACE FOR ACCESSING DIFFERENT DOCUMENT PAGES DIRECTLY WITHOUT GOING THROUGH INTERMEDIATE PAGES

This application is a continuation of U.S. patent application Ser. No. 11/496,834, filed on Jul. 31, 2006, which is a continuation of U.S. patent application Ser. No. 10/337,768, filed on Jan. 6, 2003 now U.S. Pat. No. 7,581,164.

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright Apple Computer, Inc., 2002.

FIELD OF THE INVENTION

The present invention relates to methods, such as user interfaces, for accessing document presentations or other types of presentations and more particularly, relates to access or retrieval for page document and search result presentations.

BACKGROUND OF THE INVENTION

The Internet is a global network of connected computer networks. Over the last several years, the Internet has grown significantly. A large number of computers on the Internet provide information in various forms. Anyone with a computer connected to the Internet can potentially tap into this vast pool of information. A typical user uses a browsing application (e.g., a browser) to access one or more Web pages provided by a Web server. A typical browser may be a version of Internet Explorer from Microsoft Corporation, or Netscape Communicator from Netscape Communications Corporation.

However, in a conventional user interface of a web browsing application such as Internet Explorer, in order to go back to a previous page, a user has to use a backward button to step through each of the pages between the current page and the desired previous page. Alternatively, a user may select an item from a menu corresponding to a previous page which he/she intends to retrieve. In which case, the user has to remember the title of the particular page in order to select from the menu.

For example, if a user is searching the Internet using a search engine, such as "Google" from Google Technology, Inc. (www.google.com), and the user has obtained a first search result page (listing the first, most relevant group of "hits" or matched documents) and the user has clicked on one of the hits to bring up a first page ("first hit") and then clicked on a link on the first page to obtain a second page (e.g., a further page originated from the first page), then the user would have to select (e.g. click on) the back button twice to go back to the first search result page (in order to see what other hits should be explored). Alternatively, the user would have to select the first search result page from a menu (e.g. the "Go" menu on Internet Explorer for Macintosh or the history menu on Internet Explorer for windows) assuming the user can recognize the proper page from the list of pages in the menu. These operations would also have to be performed to go back to a page which is not a search result page. While a user could make a "bookmark" or "favorite" for a page or a search result page which is obtained, the user would still have to select the proper "bookmark" or "favorite" from a menu, and repeated use of making a bookmark/favorite out of a page or search result page would clutter up a user's collection of bookmarks/favorites. The user could alternatively make a particular page or a search page the "Home" page (effectively a default initial document) but this would require the user to reset the "Home" page after each temporary use of the Home page feature, which makes this option very awkward.

SUMMARY OF THE DESCRIPTION

The present invention relates to various aspects for accessing document presentations and other types of presentations, such as a Web page via a browsing application.

In one aspect of the invention, an exemplary method of the invention allows a user to go directly to a previously accessed document presentation without having to select from a menu of document presentations or go through the intermediate pages between the current page and the previously accessed document presentation. This method may be referred to as a page snapback method or interface. In this method, when a first document presentation is accessed, a first location of the first document presentation is recorded, automatically or manually. Subsequently, when a sequence of additional document presentations originated from the first document presentation is accessed, in response to a first input, without having to select from a menu of document presentations, the first document presentation is directly retrieved from a recorded first location and displayed in a window. In one particular embodiment, a second document presentation is accessed and a second location of the second document presentation is recorded, where the recordation of the second location resets or supercedes the recordation of the first location.

In another aspect of the invention, an exemplary method of the invention allows a user to go directly to a search result from a linked document presentation originating from the search result. This method may be referred to as a search snapback method or interface. In this method, when a search result delivered by a search facility is recognized, by either a template or a domain configuration of the search facility, the location of the search result is recorded. Subsequently, when a user accesses one or more linked document presentations from the search result, in response to an input, without having to go through the intermediate pages or to select from a menu of document presentations, the search result is directly retrieved from the recorded location and displayed in a window. In a particular embodiment, the search result includes a first result page and a second result page. A first location of the first search result page is recorded when it is displayed. A second location of the second result page is recorded when the second search result page is displayed, where the recordation of the second location of the second search result page resets or supercedes the recordation of the first location of the first search result page.

In yet another aspect of the invention, the page snapback interface and the search snapback interface are operating independently within the same instance of an application in the same window.

The present invention also discloses machine readable media which may be executed by a processor to perform the above methods. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 3A to 3C show a GUI (Graphical User Interface) illustrating an exemplary page snapback interface in accordance with one embodiment of the invention.

FIGS. 5A to 5D show a GUI illustrating an exemplary page snapback interface in accordance with an alternative embodiment of the invention.

FIGS. 9A to 9C show a GUI illustrating an exemplary search snapback interface in accordance with one embodiment of the invention.

DETAILED DESCRIPTION

Figure 1:
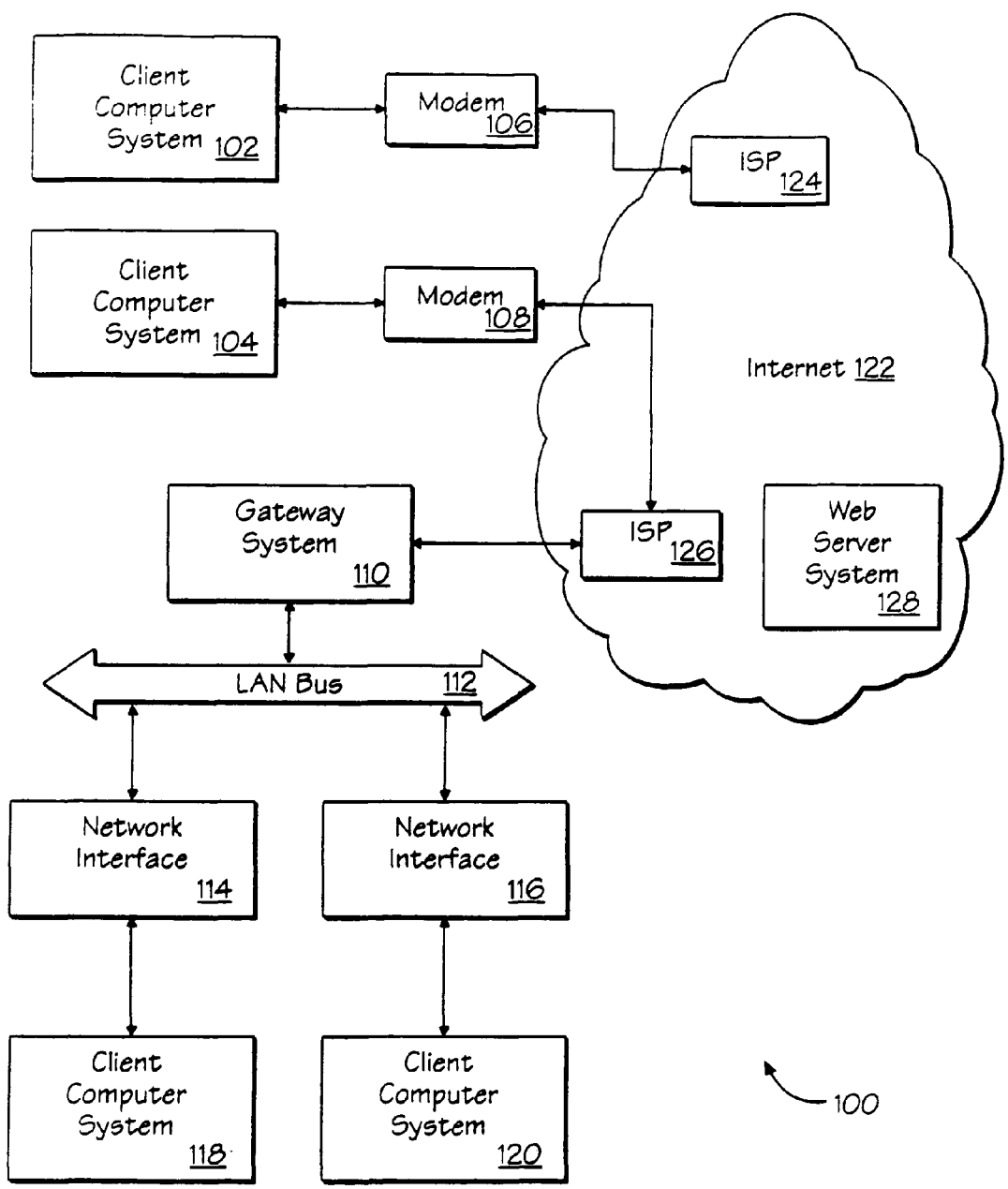
FIG. 1 is a block diagram of a network of computer systems in which presentations, such as document presentations, may be accessed via snapback interfaces, according to one embodiment of the invention.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar data processing device, that manipulates and transforms data represented as physical (e.g. electronic) quantities within the computer system's registers and memories into other data similarly represented as physical quantities within the computer system memories or registers or other such information storage, transmission or display devices.

The present invention also relates to apparatuses for performing the operations described herein. An apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as Dynamic RAM (DRAM), EPROMs, EEPROMs, magnetic or optical cards, or any type of media suitable for storing electronic instructions, and each of the above storage components is coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods. The structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Embodiments of the present invention provide snapback interfaces to allow a user of an application, such as a browser, a media presentation application (e.g. an audio player), an electronic library or book, a slide presentation, or a file system navigator (e.g., such as the Finder in the Macintosh operating system or Windows Explorer in the Microsoft Windows operating system), to directly retrieve a document presentation from a recorded location without having to go through the intermediate pages or select from a menu of document presentations. In one embodiment, when a document presentation is obtained via certain methods, such as typing an address in an address field, selecting a favorite site from a bookmark menu, or accessing a link, such as a URL (uniform resource locator) link, from a document (e.g., an email), the location of the document presentation is automatically recorded. Upon receiving an input, such as an activation of a snapback button, the document is directly retrieved and redisplayed in the same window. In another embodiment, when a user requests a search from a search engine (e.g. Google), when a search result is delivered and recognized, the location of the search result page is recorded. When the user accesses a linked document from the search result page, the snapback interface allows a user to directly retrieve (e.g., snapback to) the search result page without having to go through the intermediate linked document pages.

FIG. 1 is a diagram of a network of computer systems in which a snapback user interface may be used, according to one embodiment of the present invention. As shown in FIG. 1, a network 100 includes a number of client computer systems that are coupled together through an Internet 122. It will be appreciated that the term "Internet" refers to a network of networks. Such networks may use a variety of protocols for exchange of information, such as TCP/IP, ATM, SNA, SDI, etc. The physical connections of the Internet and the protocols and communication procedures of the Internet are well known to those in the art. It will be also appreciated that such system may be implemented in an Intranet within an organization.

Access to the Internet 122 is typically provided by Internet service providers (ISPs), such as the ISP 124, and the ISP 126. Users on client systems, such as the client computer systems 102, 104, 118, and 120, generally obtain access to the Internet through Internet service providers, such as ISPs 124 and 126. Access to the Internet may facilitate transfer of information (e.g., email, text files, media files, etc.) between two or more digital processing systems, such as the client computer systems 102, 104, 118, and 120 and/or a Web server system 128. For example, one or more of the client computer systems 102, 104, 118, and 120 and/or the Web server 128 may provide document presentations (e.g., a Web page) to another one or more of the client computer systems 102, 104, 118, and 120 and/or Web server 128. For example, in one embodiment of the invention, one or more client computer systems 102, 104, 118, and 120 may request to access a document that may be stored at a remote location, such as the Web server 128. In the case of remote storage, the data may be transferred as a file (e.g., download) and then displayed (e.g., in a window of a browser) after transferring the file. In another embodiment, the document presentation may be stored locally at the client computer systems 102, 104, 118, and/or 120. In the case of local storage, the client system may retrieve and display the document via an application, such as a word processing application. Without requiring a network connection.

The Web server 128 typically includes at least one computer system to operate with one or more data communication protocols, such as the protocols of the World Wide Web, and as such, is typically coupled to the Internet 122. Optionally, the Web server 128 may be part of an ISP which may provide access to the Internet and/or other network(s) for client computer systems. The client computer systems 102, 104, 118, and 120 may each, with appropriate Web browsing software, access data, such as HTML document (e.g., Web pages), which may be provided by the Web server 128. The browsing software may incorporate a snapback interface in accordance with one embodiment of the invention, to allow a user to directly retrieve a document presentation from a recorded location without having to go through the intermediate pages.

The ISP 124 provides Internet connectivity to the client computer system 102 via a modem interface 106, which may be considered as part of the client computer system 102. The client computer systems 102, 104, 118, and 120 may be a conventional data processing system, such as a Power Mac G4 or iMac computer available from Apple Computer, Inc., a "network" computer, a handheld/portable computer, a cell phone with data processing capabilities, a Web TV system, or other types of digital processing systems (e.g., a personal digital assistant (PDA)).

Similarly, the ISP 126 provides Internet connectivity for the client computer systems 102, 104, 118, and 120. However, as depicted in FIG. 1, such connectivity may vary between various client computer systems, such as the client computer systems 102, 104, 118, and 120. For example, as shown in FIG. 1, the client computer system 104 is coupled to the ISP 126 through a modem interface 108, while the client computer systems 118 and 120 are part of a local area network (LAN). The interfaces 106 and 108, shown as modems 106 and 108, respectively, may represent an analog modem, an ISDN modem, a DSL modem, a cable modem, a wireless interface, or other interface for coupling a digital processing system, such as a client computer system, to another digital processing system. The client computer systems 118 and 120 are coupled to a LAN bus 112 through network interfaces 114 and 116, respectively. The network interface 114 and 116 may be an Ethernet-type, asynchronous transfer mode (ATM), or other type of network interface. The LAN bus is also coupled to a gateway digital processing system 110, which may provide firewall and other Internet-related services for a LAN. The gateway digital processing system 110, in turn, is coupled to the ISP 126 to provide Internet connectivity to the client computer systems 118 and 120. The gateway digital processing system 110 may, for example, include a conventional server computer system. Similarly, the Web server 128 may, for example, include a conventional server computer system.

Figure 2:
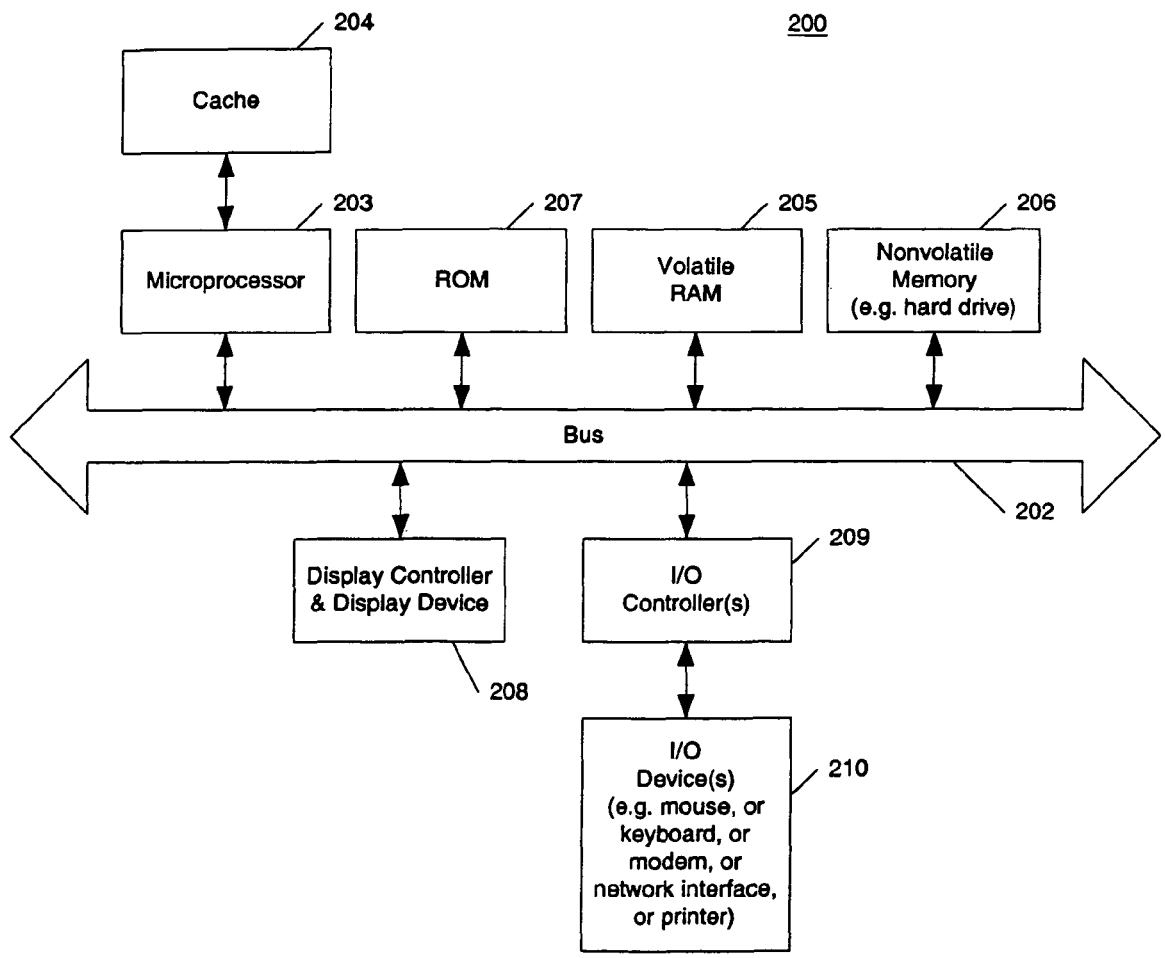
FIG. 2 is a block diagram of a digital processing system which may be used to access a document presentation via snapback interfaces, in accordance with one embodiment of the invention.

FIG. 2 is a block diagram of a digital processing system which may be used with one embodiment of the invention. For example, the system 200 shown in FIG. 2 may be used as a client computer system (e.g., the client computer systems 102, 104, 118, and/or 120), a Web server system (e.g., the Web server system 128), or a conventional server system, etc. Furthermore, the digital processing system 200 may be used to perform one or more functions of an Internet service provider, such as the ISP 124 and 126.

Note that while FIG. 2 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 2 may, for example, be an Apple Macintosh computer.

As shown in FIG. 2, the computer system 200, which is a form of a data processing system, includes a bus 202 which is coupled to a microprocessor 203 and a ROM 207, a volatile RAM 205, and a non-volatile memory 206. The microprocessor 203, which may be a PowerPC G3 or PowerPC G4 microprocessor from Motorola, Inc. or IBM, is coupled to cache memory 204 as shown in the example of FIG. 2. The bus 202 interconnects these various components together and also interconnects these components 203, 207, 205, and 206 to a display controller and display device 208, as well as to input/output (I/O) devices 210, which may be mice, keyboards, modems, network interfaces, printers, and other devices which are well-known in the art. Typically, the input/output devices 210 are coupled to the system through input/output controllers 209. The volatile RAM 205 is typically implemented as dynamic RAM (DRAM) which requires power continuously in order to refresh or maintain the data in the memory. The non-volatile memory 206 is typically a magnetic hard drive, a magnetic optical drive, an optical drive, or a DVD RAM or other type of memory system which maintains data even after power is removed from the system. Typically the non-volatile memory will also be a random access memory, although this is not required. While FIG. 2 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 202 may include one or more buses connected to each other through various bridges, controllers, and/or adapters, as is well-known in the art. In one embodiment, the I/O controller 209 includes a USB (Universal Serial Bus) adapter for controlling USB peripherals.

Figure 3B:
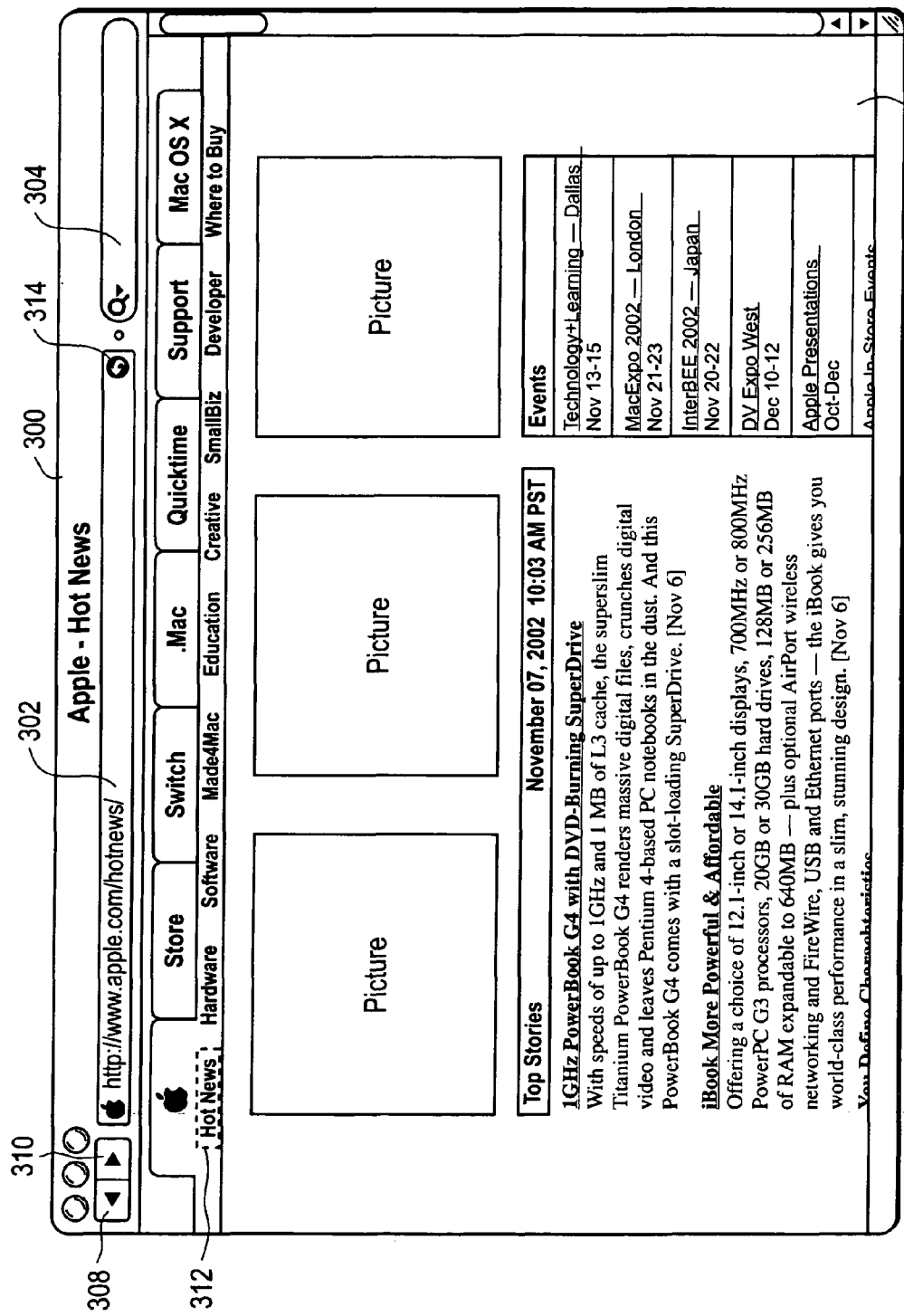
Figure 3C:
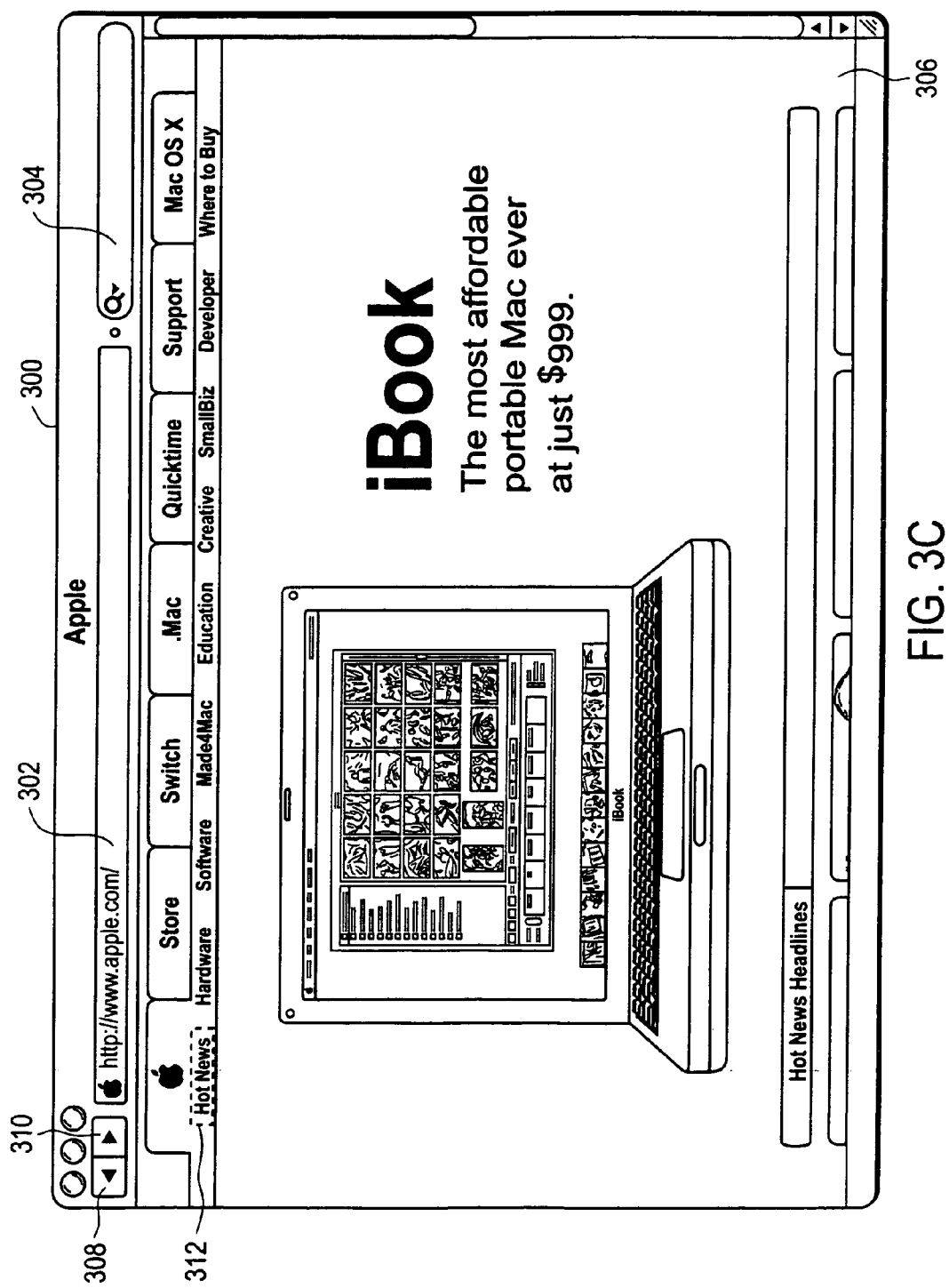

FIGS. 3A to 3C show a GUI having a snapback interface in accordance with one embodiment of the invention. The GUI 300 may be incorporated into a browser. Alternatively, the GUI 300 may be implemented within other applications, such as word processing software or an audio player software or a multimedia player software such as the Quicktime Player. In these alternative applications, the document presentations may be displayed images or may be audio sounds (e.g. music) or motion pictures with or without sounds. Referring to FIG. 3A, in one embodiment, the GUI 300 includes, among other items, an address field 302, a search field 304, and a display window 306. The address field 302 allows a user to enter (e.g. by typing a URL) an address or location of a document presentation a user intends to retrieve. The address entered into the address field may be a Web site address over an Internet. Alternatively, the address entered may be a location of an Intranet server within an organization. Furthermore, the address entered may be an article or chapter location of an electronic library, an electronic book, or an electronic dictionary. For illustration purposes, the embodiment shown in FIGS. 3A to 3C shows a GUI incorporated into a browser. It would be apparent to those with skill in the art that the GUI may be implemented with other applications.

Referring to FIG. 3A, when a user types an address in the address field 302 and instructs the browser to access a Web page corresponding to the address entered into the address field 302, the browser retrieves the Web page from the respective server and displays the page in the window 306. In one embodiment, once the Web page is accessed, the location of the Web page is recorded and may be saved in a memory location, such as volatile RAM 205 or nonvolatile memories 206 of system 200 shown in FIG. 2. In one embodiment, the location of the Web page is automatically recorded when the Web page is accessed via certain predetermined methods, such as, for example, typing an address into the address field, selecting a favorite location from a bookmark menu, or accessing a link, such as a URL (uniform resource locator) link, from a document (e.g., an email). In an alternative embodiment, a user may specifically instruct the browser to record a location of a document presentation by, for example, select a corresponding command item from a menu (e.g. command item "Mark Page for Snapback" or "set snapback page") or via a preprogrammed key strokes (e.g., preprogrammed one or more keys in sequence or in combination, also referred as hotkeys).

When a user accesses a sequence of Web pages (e.g., a second page) which originated from the original page (e.g., a first page), the snapback interface allows the user to directly go back (e.g., snapback) to the original page without having to go through the intermediate pages. For example, according to one embodiment, when a user accesses a page by selecting a page or a document link 312 from the original page a snapback button 314 is displayed, as shown in FIG. 3B, in the address field when the document presentation associated with the link 312 is displayed in the window 306. A cursor controlled through a pointing device (e.g., a mouse, trackball, touchpad, arrow keys of a keyboard, etc.) enables a user to activate the snapback button 314 to snapback to the original page as shown in FIG. 3C without having to select from a menu of document presentations. It would be appreciated that the snapback button 314 may be positioned at other locations within the window 306, such as, for example, at a status bar (not shown) of the window. It would be apparent to those with ordinary skill in the art that other shapes or configuration of the snapback button may be implemented.

Figure 7A:
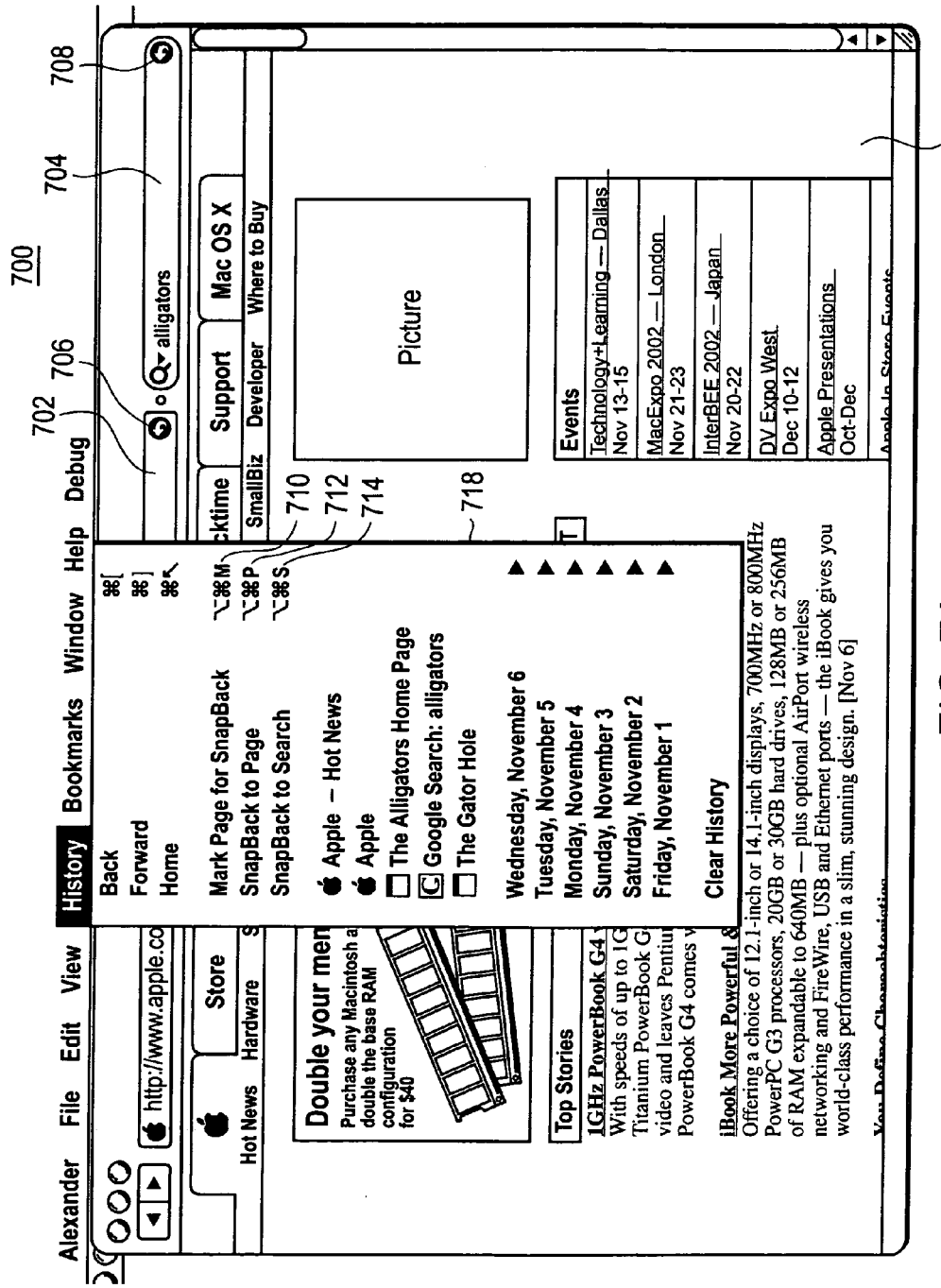
FIGS. 7A and 7B show a GUI illustrating an exemplary page snapback interface in accordance with yet another embodiment of the invention.

Further in addition to the button 314 or instead of the button 314, the snapback command may be invoked from a menu of commands as shown in FIG. 7A. Once the original page is redisplayed in the window 306, the snapback button 314 may be removed or disabled (e.g., grayed out) from the display.

It will be appreciated that there may be a plurality of pages between the document presentation shown in FIG. 3B and the original page shown in FIG. 3A. In a conventional browser, a user has to use a back button, such as a backward button 308 to go back to the original page, by going through all the intermediate pages between the current page and the original page (or page set as the snapback page). Alternatively, a user has to use a pull-down menu (e.g. a "Go" menu or a history menu) to select an address of the original page. As a result, the user has to remember the domain name or other identifier of the original page in order to select it from the menu.

Figure 4A:
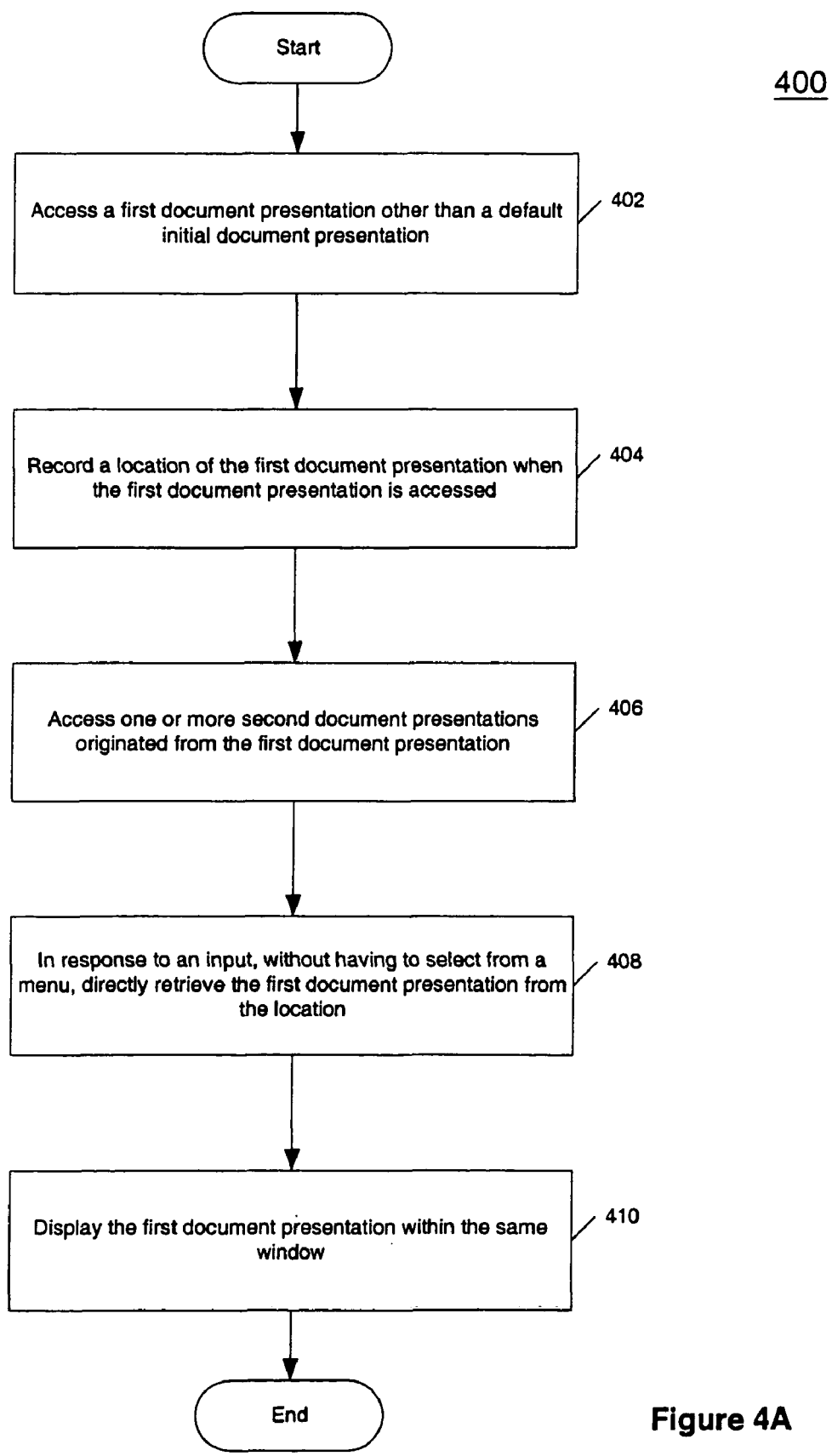
FIG. 4A shows a flow diagram illustrating an exemplary page snapback process in accordance with one embodiment of the invention.

FIG. 4A shows a flow diagram of an exemplary method illustrating a snapback process in accordance with one embodiment of the invention. Referring to FIG. 4A, at block 402, a user accesses a first document presentation other than a default initial document presentation, such as a home page. At block 404, the system records a location (e.g., address) of the first document presentation when the first document presentation is accessed. At block 406, when the user accesses one or more second document presentations originated from the first document presentation, in response to an input, at block 408, without having to select from a menu of document presentations, the system directly retrieves the first document presentation from the recorded location. At block 410, the retrieved first document presentation is redisplayed in the same window.

Figure 4B:
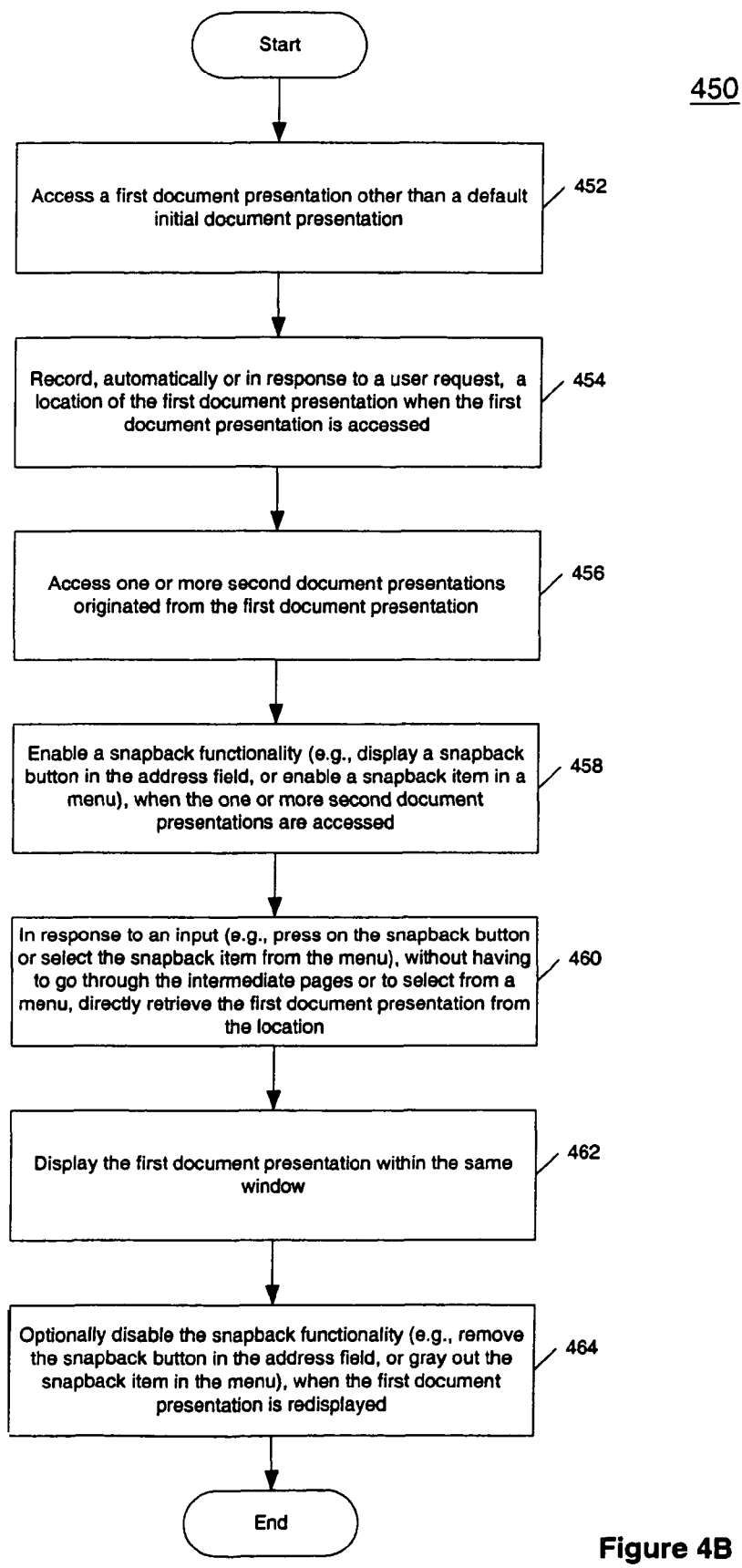
FIG. 4B shows a flow diagram illustrating an exemplary page snapback process in accordance with another embodiment of the invention.

FIG. 4B shows a flow diagram of an exemplary method illustrating a snapback process in accordance with another embodiment of the invention. Referring to FIG. 4B, at block 452, a user accesses a first document presentation (e.g., document presentation shown in FIG. 3A) other than a default initial document presentation (e.g., a home page). At block 454, the system records, automatically or in response to a user request, a location (e.g., address) of the first document presentation when the first document presentation is accessed. In one embodiment, the system automatically records the location of the first document presentation when the first document presentation is accessed via certain methods, such as, for example, typing an address in the address field and obtaining the page at this address, selecting a favorite site from a bookmark menu, accessing a link embedded in a document such as an email, or the system may record the location of the first page displayed in a newly opened window. Alternatively, a user may explicitly request the system to record the location of the document (e.g. the user selected the "Mark Page for Snapback" in a menu). At block 456, the user accesses one or more second document presentation, such as one shown in FIG. 3B, which originated from the first document presentation. When the one or more second document presentations are accessed, at block 458, the systems enables or makes available the snapback functionality by, for example, displaying a snapback button in the address field, or enabling a snapback command item in a menu or doing both. In response to an input, such as, for example, by clicking on the snapback button or selecting the snapback command item from the menu, at block 460, without having to go through the intermediate pages between the first and second document presentations, the system directly retrieves the first document presentation from the recorded location. At block 462, the first document presentation is redisplayed within the same window. Thereafter, at block 464, the system optionally makes it appear to the user that the snapback functionality associated with the first document presentation is disabled (e.g., removing the snapback button from the display or graying out the snapback item in the menu) when the first document presentation is redisplayed. However, the snapback functionality in this case is still available once another page is displayed.

In other words, the snapback functionality is only removed from the user for the first document presentation, such that a user would not be able to activate the snapback button because the first document presentation is now being redisplayed. The snapback functionality itself is still available. It is also appreciated that the input to perform a snapback (as if the user had selected the snapback button) may be received from a third party application through an inter-process API (application programming interface). Alternatively, the input may be received from a remote site over a network, such as a VPN (virtual private network).

According to one embodiment, a location of an initial default document, such as a home page, may also be recorded by the page snapback interface. When an application is launched, the application may initially record the location of the initial default page. As a result, the initial default page may be accessed via the page snapback functionality. For example, a user using a browser to access an Internet may use the page snapback functionality to snapback to the home page, though the home page may also be accessed by clicking a "home" button from a tool bar.

Figure 5A:
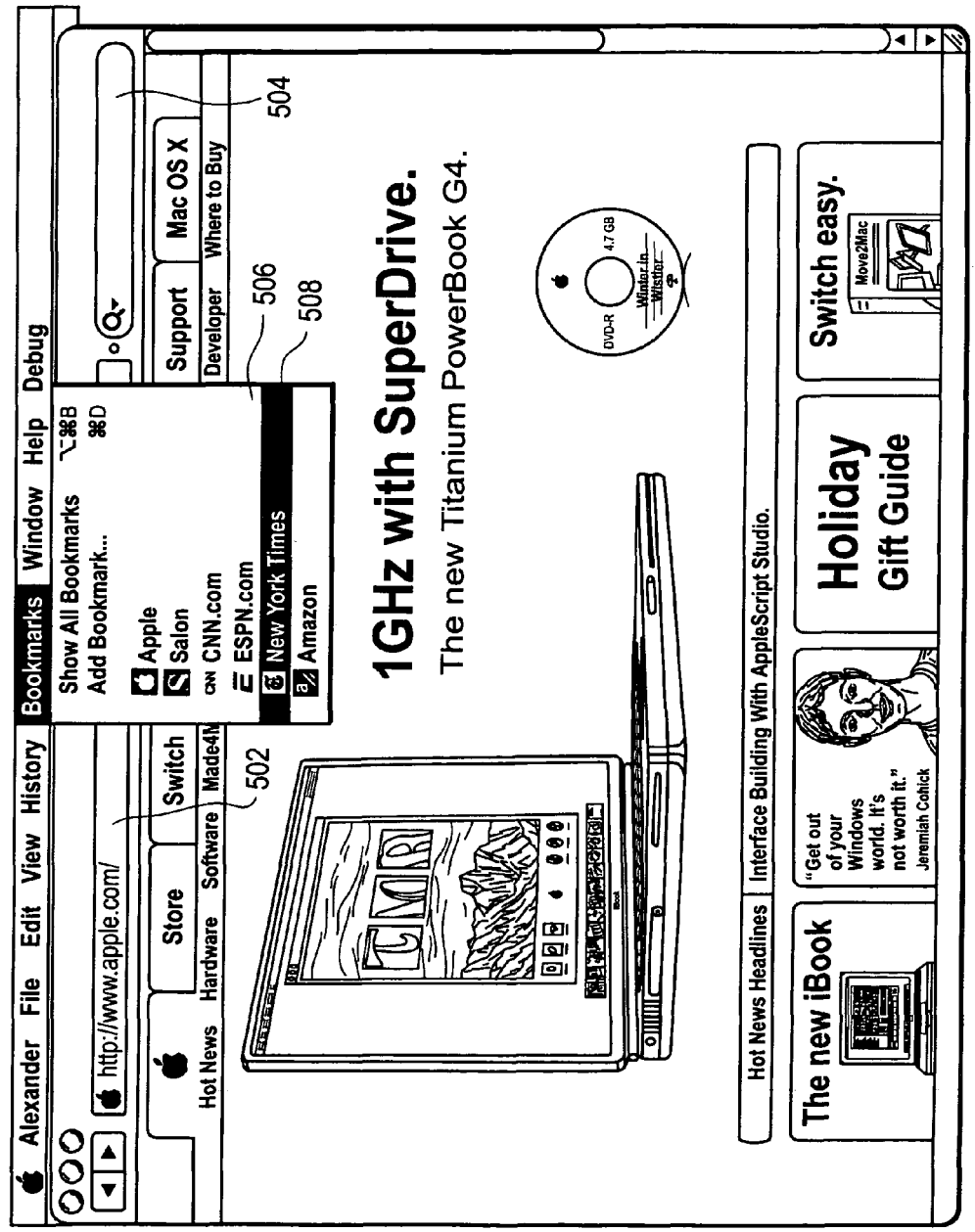
Figure 5B:
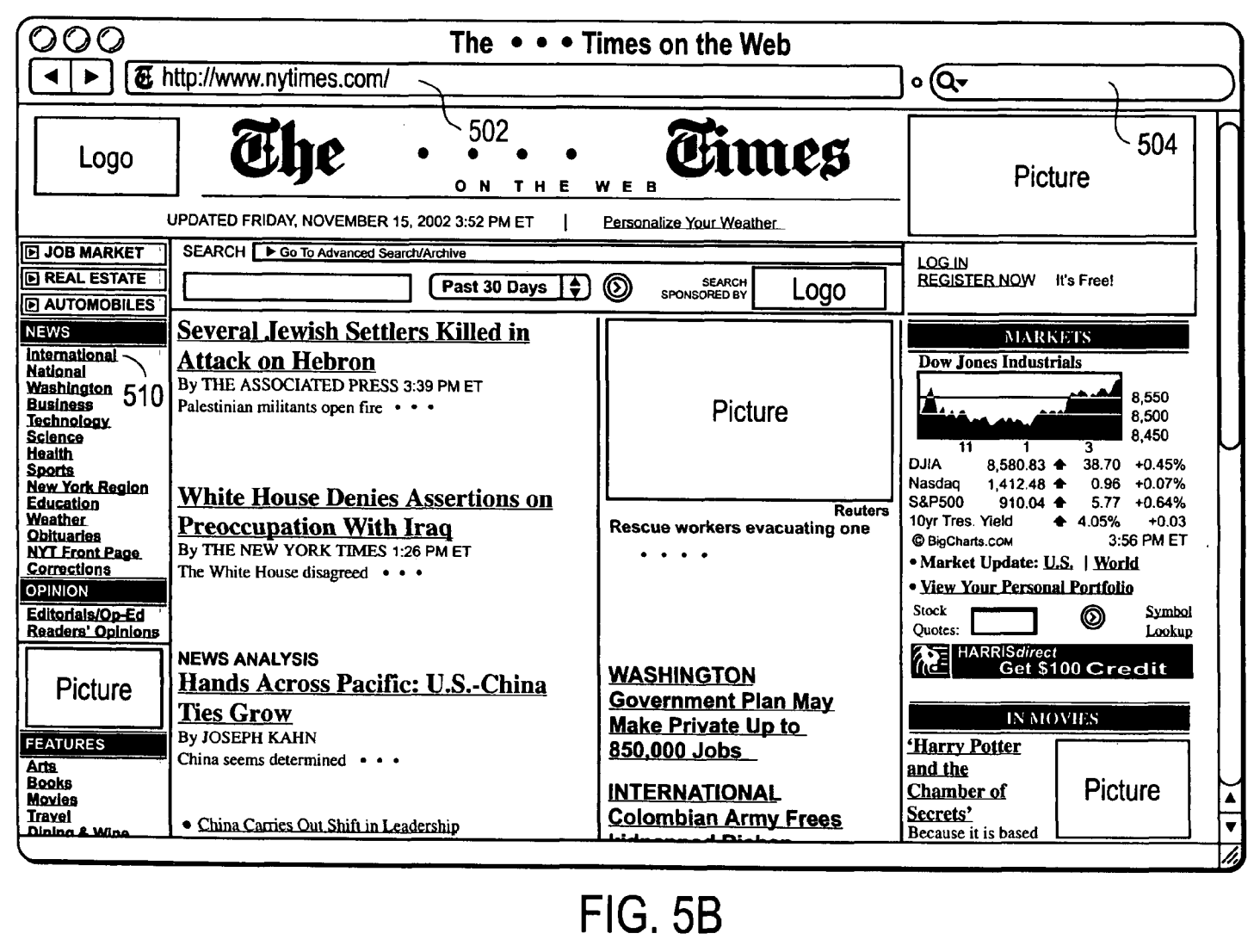
Figure 5C:
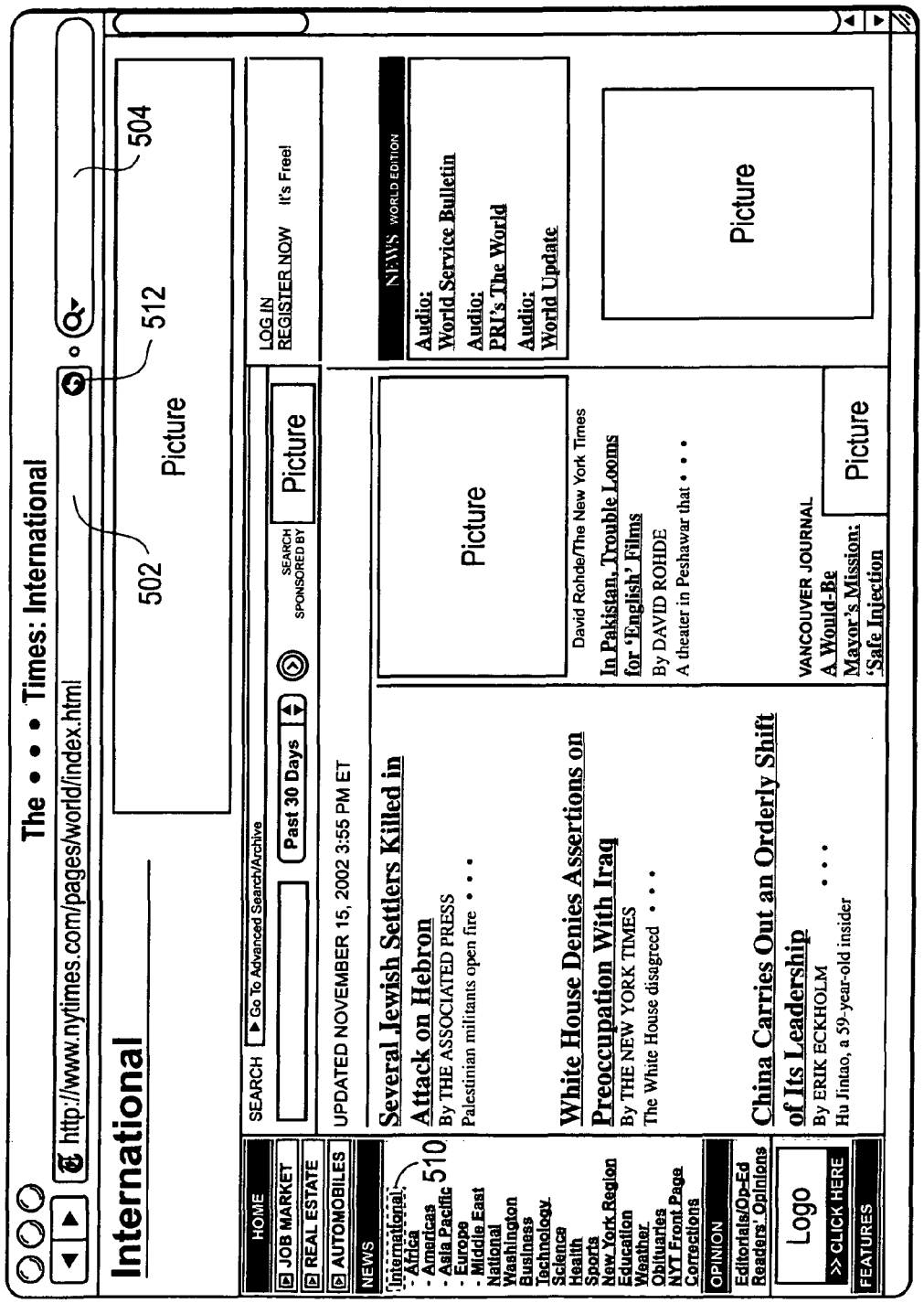
Figure 5D:
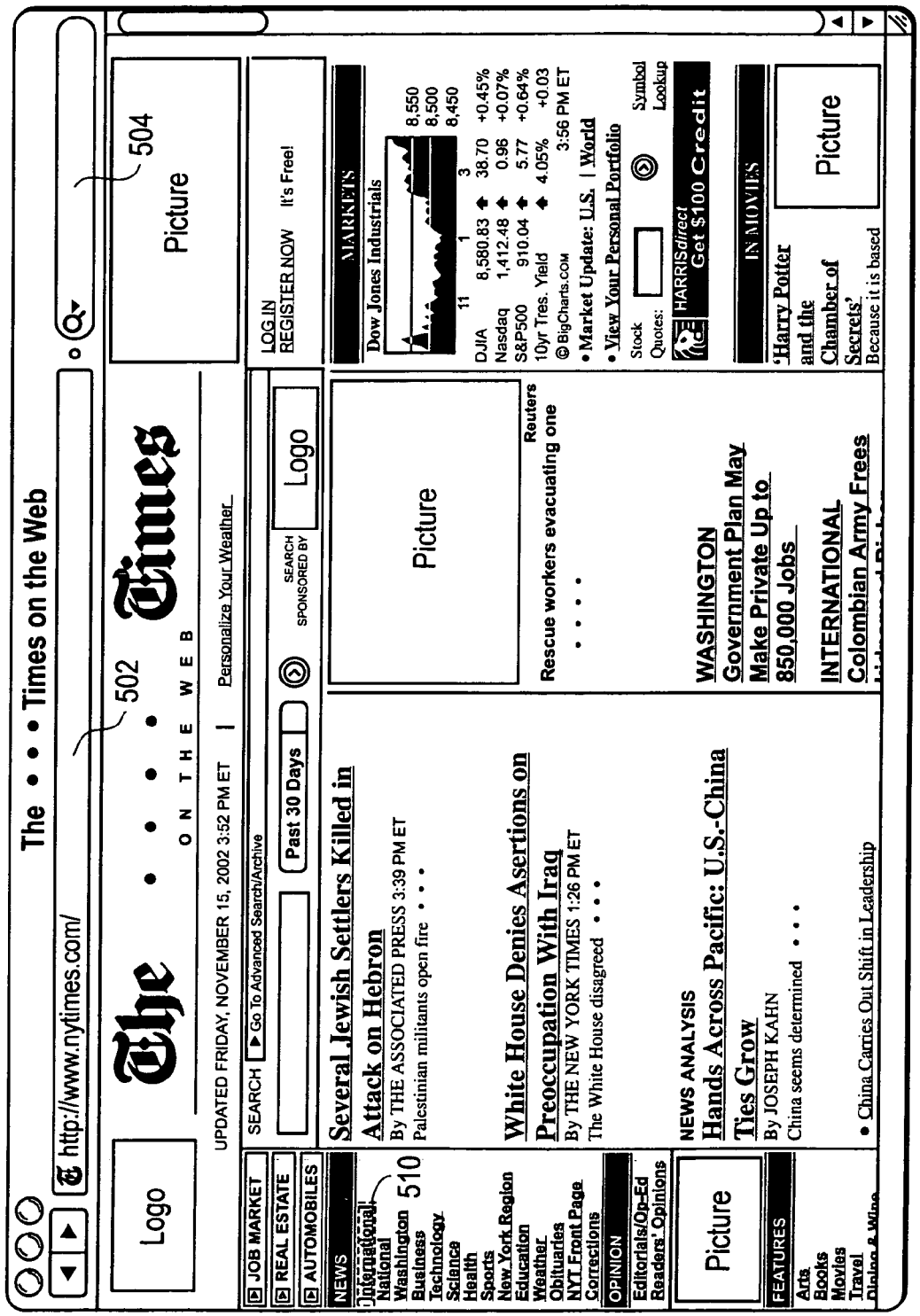

A location of a document may be automatically recorded when the document is accessed via certain predetermined methods. As illustrated in FIGS. 5A to 5D, according to one embodiment, a location of a document is automatically recorded when the document is accessed via a selection of a favorite from a bookmark menu. Referring to FIG. 5A, the exemplary GUI includes an address field 502 and a search field 504. The GUI also includes a menu having a bookmark menu 506. The bookmark menu 506 includes a set of favorite sites which include, among others, the favorite site 508. When a user selects the favorite site 508 from the bookmark menu 506, the corresponding document or Web page is displayed in the window, as shown in FIG. 5B, and the location of the favorite site is automatically recorded as a snapback page. When a user further accesses one or more linked document from the favorite site, such as document link 510, the linked document is displayed within the window, as shown in FIG. 5C. Meanwhile, a snapback button 512 is displayed in the address field 502 to allow the user to snapback to the original favorite page (e.g., the document shown in FIG. 5B). In one embodiment, a snapback item in a corresponding menu is also enabled. As a result, a user may activate the snapback functionality by clicking the snapback button (e.g. positioning a cursor over the displayed image of the button and press a mechanical button on a mouse) or alternatively by selecting (through a pull down menu operation) the snapback item from a menu to snapback to the original page as shown in FIG. 5D. As shown in FIG. 5D, the snapback button is optionally removed from the display when the original favorite page is redisplayed again. In a further embodiment, the snapback functionality may be activated by a preprogrammed hotkey keystroke associated with the snapback item of a menu. It would be appreciated that the snapback functionality may also be activated by other mechanisms apparent to those with ordinary skills in the art, such as, for example, a voice, a stylus, or other input methods.

Figure 6A:
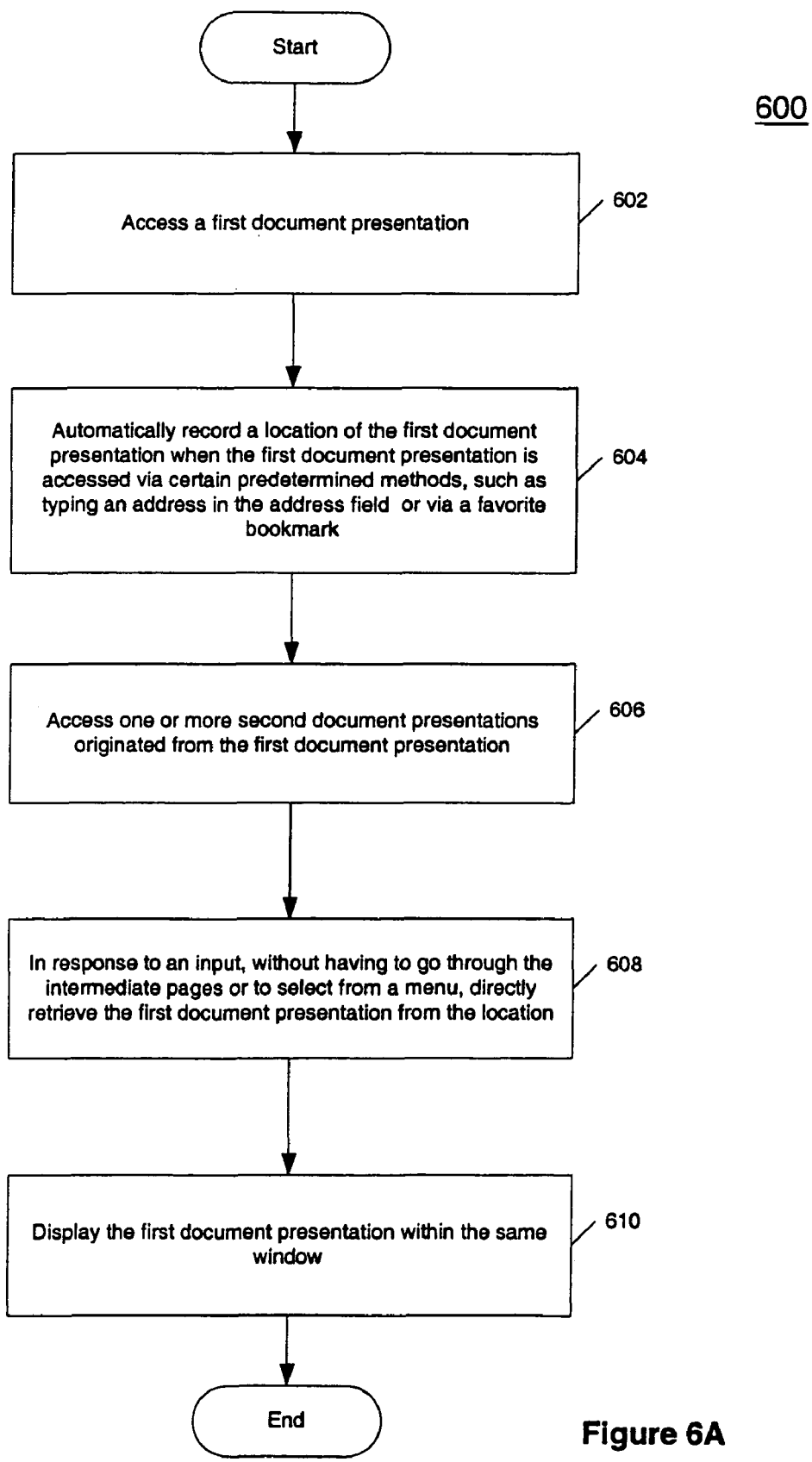
FIGS. 6A and 6B are flow diagrams illustrating exemplary page snapback processes in accordance with yet another embodiment of the invention.

FIG. 6A is a flow diagram illustrating an exemplary snapback process in accordance with one embodiment of the invention. Referring to FIG. 6A, at block 602, a user accesses a first document presentation. At block 604, the system automatically records a location of the first document presentation when the first document presentation is accessed via certain predetermined methods, such as, for example, by typing an address in the address field or selecting a favorite site from a bookmark menu. At block 606, the user accesses one or more second document presentations which originated from the first document presentation. In response to an input, at block 608, without having to go through the intermediate pages between the first and second document presentations, the system directly retrieves the first document presentation from the recorded location and at block 610, the first document presentation is redisplayed in the window.

Figure 6B:
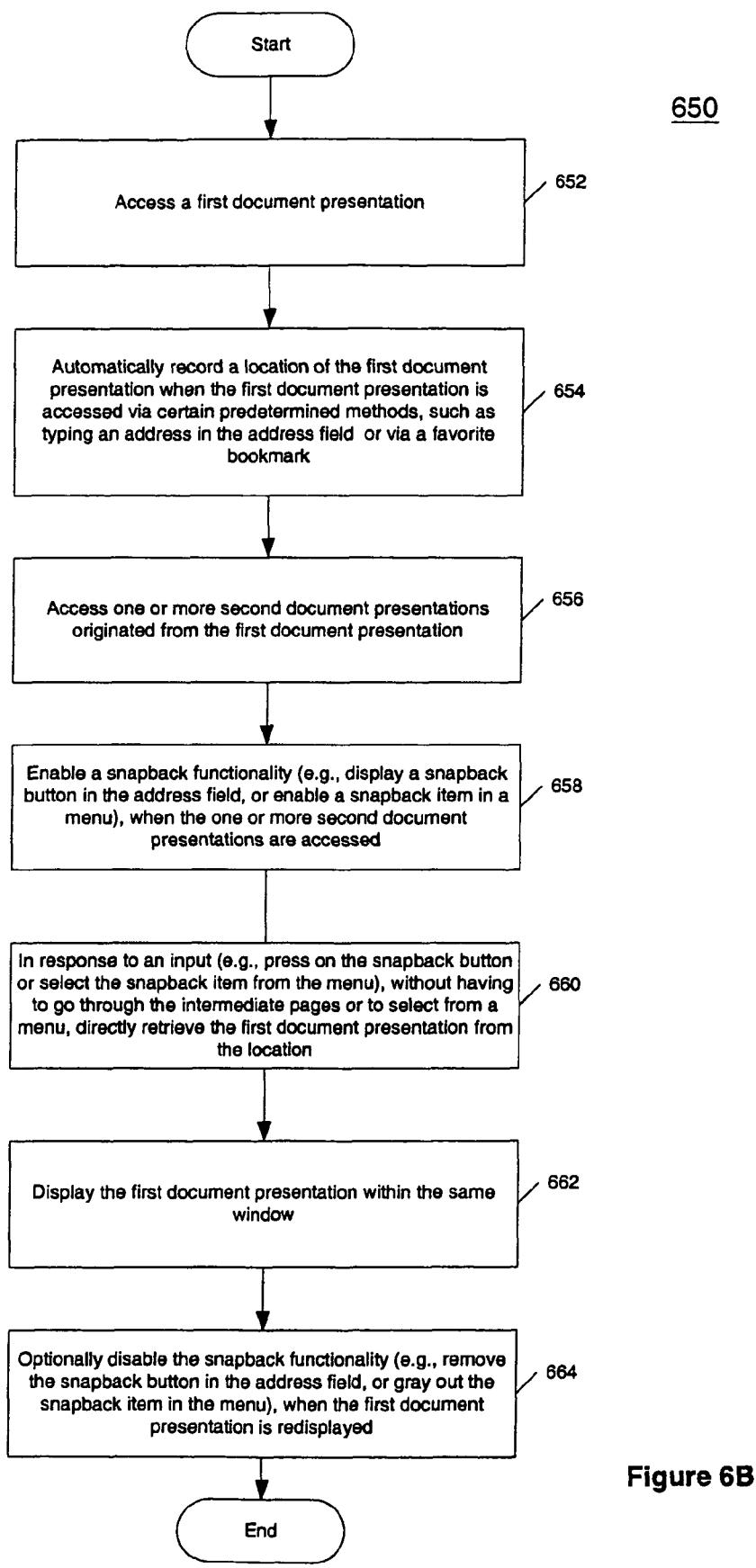

FIG. 6B is a flow diagram illustrating an exemplary snapback process in accordance with another embodiment of the invention. Referring to FIGS. 5A-5D and 6B, according to one embodiment, at block 652, a user accesses a first document presentation (e.g., a Web page or an electronic article) from a variety of ways. At block 654, the system automatically records a location of the first document presentation (e.g., an address of a Web page or chapter location of an electronic article), when the first document presentation is accessed via certain predetermined methods. In one embodiment, the location of the first document presentation is automatically recorded when it is accessed by typing a corresponding address in the address field such as address field 502, or alternatively, when it is accessed via a selection from a favorite location from a bookmark menu, such as, for example, favorite location 508 from the bookmark menu 506.

Once one or more second document presentations (e.g., linked document 510) are accessed from the first document, as shown in FIG. 5C, at block 658, the system enables a snapback functionality associated with the first document presentation or makes it available to the user. In one embodiment, the system displays a snapback button in the address field within the window. In an alternatively embodiment, the system enables or makes available a corresponding snapback item appeared in a menu, such as, for example, page snapback item 712 of FIG. 7A which will be described in details further below.

In response to an input, at block 660, without having to go through all the intermediate pages between the first and second document presentations, the system directly retrieves the first document presentation from the recorded location and, at block 662, redisplays the first document presentation in the window. In one embodiment, the input is received via a clicking of the snapback button (e.g., snapback button 512 of FIG. 5C) by the user. In an alternative embodiment, the input is received via a selection of a snapback command item from a menu (e.g., page snapback item 712 of FIG. 7A). Alternatively, the input may be received by a preprogrammed keystroke associated with the snapback item (e.g., a preprogrammed hotkey). In a further embodiment, the input may be received from a third party application via an inter-process API. Alternatively, the input may be received from a remote application over a network, such as, for example, a VPN (virtual private network).

Once the first document presentation is redisplayed in the window, at block 664, the system may optionally disable the snapback functionality related to the first document presentation. In one embodiment, the system may optionally remove the snapback button 512 from the display, as shown in FIG. 5D. Alternatively, the system may optionally disable or gray out the snapback item from a menu, such as, for example, snapback item 712 of menu 718. It important to note that the snapback functionality is only optionally disabled or made unavailable to the first document presentation because the first document presentation is now redisplayed and another snapback activation will redisplay the first document presentation again. The snapback functionality is still available for other document presentations when certain actions described above take place.

Figure 7B:
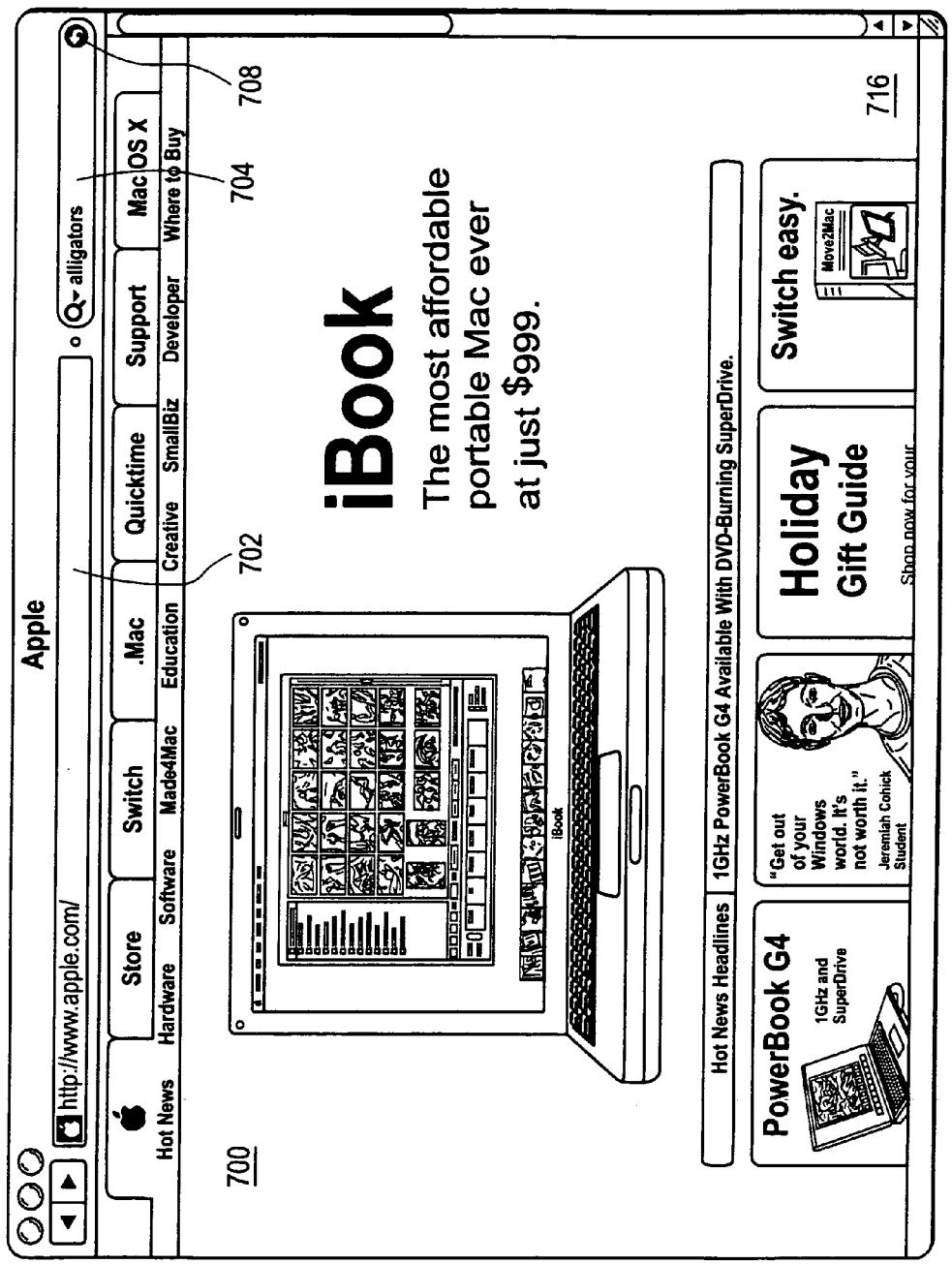

As described above, according to one embodiment of the invention, the snapback functionality can be accessed via either a snapback button displayed in the GUI or via a corresponding snapback item in a menu, as shown in FIGS. 7A and 7B. Referring to FIGS. 7A and 7B, the exemplary GUI 700 includes, among others, an address field 702 and a search field 704. When subsequent one or more second document presentations are accessed from a first document presentation with a recorded location, a snapback button 706 is displayed in the window. In this embodiment, the snapback button is displayed in the address field. It would be appreciated that the snapback button 706 may be positioned at other locations of the GUI, such as a status bar. In addition, according to one embodiment, a snapback indicator, such as an icon, may be displayed next to a corresponding recorded snapback page at a history menu to indicate that the corresponding page has been marked as a snapback page. As a result, when a user pulls down the history menu, the user may obtain which page or pages have been marked as snapback pages. Furthermore, according to one embodiment, the snapback functionality can be activated via a snapback item, such as snapback item 712 of menu 718. As a result, a user may either select or activate (e.g. by clicking on) the snapback button 706 or select the snapback item 712 from the menu 718 to activate the snapback functionality. Alternatively, the snapback functionality may be activated via a preprogrammed key (e.g., a preprogrammed hotkey) associated with the snapback item 712 of menu 718.

As described above, the location of the first document presentation is automatically recorded when the first document presentation is accessed via certain predetermined methods (e.g., typing an address into the address field or selecting a favorite site from a menu). In addition, according to one embodiment, the location of the first document presentation may be recorded manually in response to a user request. For example, a user may record or mark a current document presentation for snapback by selecting a corresponding item in a menu, such as item 710 of menu 718. Alternatively, such action may also be performed by a preprogrammed keystroke (e.g., a hotkey) associated with the item 710 of menu 718.

As described above, a location of a document presentation may be recorded automatically when the document presentation is accessed via certain predetermined methods (e.g., entering an address into an address field or selecting a favorite location from a bookmark menu or the presentation is the first (in time) for a newly opened window), or alternatively it may be manually recorded in response to a user request (e.g. user selects "Mark Page for Snapback"). According to one embodiment, a subsequent recordation of a location for a particular window may reset a previous recordation. As a result, a snapback activation (e.g. clicking a snapback button 706) would snapback to a document presentation with a latest recorded location for a particular window.

Figure 8:
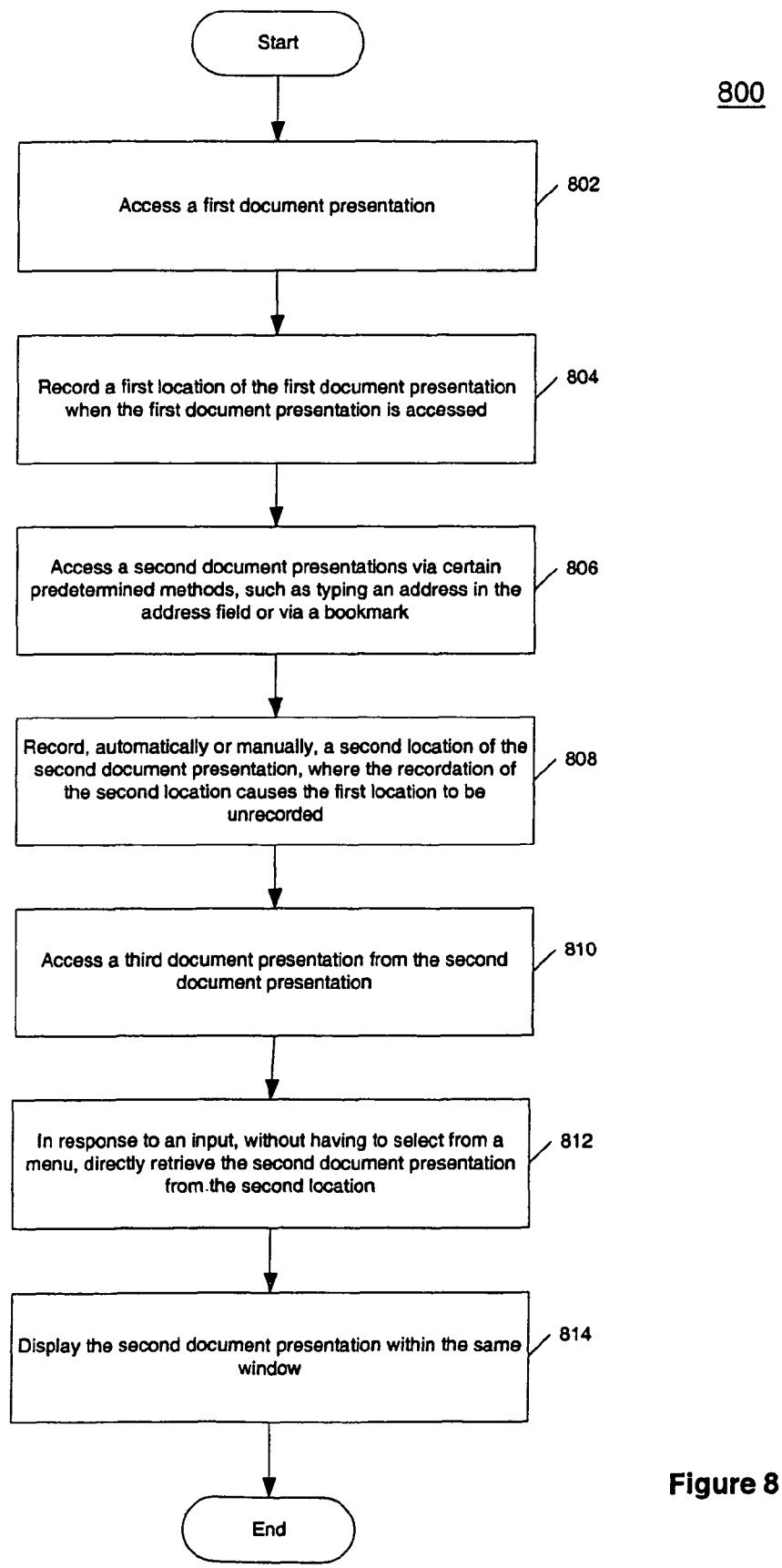
FIG. 8 shows a flow diagram illustrating an exemplary page snapback process in accordance with yet another embodiment of the invention.

FIG. 8 is flow diagram illustrating an exemplary process where a subsequent recordation resets the previous recordation for a particular window in accordance with one embodiment of the invention. Referring to FIG. 8, in one embodiment, the exemplary process 800 includes accessing a first document presentation from a first location, the first location being recorded for snapback (e.g. the first location is recorded as a result of the user selecting a bookmark/favorite corresponding to the first document presentation), the first document presentation being displayed within a window, accessing a second document presentation which is displayed within the window, and recording a second location of the second document presentation (e.g. the second location may be recorded as a result of the user selecting a bookmark/favorite or selecting "Mark Page for Snapback" or type an address in the address field), wherein the recordation of the second location causes the first location to be unrecorded or otherwise not functional (such that selection of the snapback button will re-display the second document presentation, but not the first document presentation).

Referring to FIG. 8, at block 802, a first document presentation is accessed. At block 804, a first location of the first document presentation is recorded when the first document presentation is accessed. In one embodiment, the first location is automatically recorded when the first document presentation is accessed via certain predetermined methods, such as, for example, by entering an address in the address field or selecting a favorite location from a bookmark menu. In an alternative embodiment, the first location may be recorded manually in response to a user request, such as, for example, by selecting a corresponding command item from a menu (e.g., item 710 of menu 718 in FIG. 7A) or a keystroke of a preprogrammed key (e.g., a hotkey). At block 806, a second document presentation is accessed. At block 808, a second location of the second document presentation is recorded. In one embodiment, the second document presentation is accessed via certain predetermined methods, such as entering an address in the address field or selecting a favorite location from a menu, in which case, the second location is automatically recorded. In an alternative embodiment, the second document presentation is accessed via other methods, such as, for example, via a link originated from the first document, in which case, the second location is recorded manually upon receiving a user request (e.g., selecting a corresponding item 710 from menu 718 of FIG. 7A by a user). According to one embodiment, the recordation of the second location resets the recordation of the first location. As a result, the first location of the first document presentation is unrecorded making the first location not functional.

At block 810, a third document presentation is accessed from the second document presentation. In response to an input, at block 812, without having to go through all the intermediate document presentations between the second and third document presentations, the system directly retrieves the second document presentation from the recorded second location (rather than the unrecorded first location). In one embodiment, the input is received via a clicking of the snapback button (e.g., snapback button 512 of FIG. 5C) by the user. In an alternative embodiment, the input is received via a selection of a snapback item from a menu (e.g., page snapback item 712 of FIG. 7A). Alternatively, the input may be received by a preprogrammed keystroke associated with the snapback item (e.g., a preprogrammed hotkey). In a further embodiment, the input may be received from a third party application via an inter-process API. Alternatively, the input may be received from a remote application over a network, such as, for example, a VPN (virtual private network).

According to yet another embodiment of the invention, more than one recorded locations may be maintained. A recordation of a second location would not overwrite a first recorded location (e.g., a previous recorded location). As a result, the first and second recorded locations coexist and are maintained by the system. A user may wish to set a snapback trial that could be used to hop back to various points it has already visited. For example, in a search facility that allows nested searches, a user may conduct an initial search which generates a first search result. After browsing around the first search result, the user may wish to request a second search (e.g., a narrower search) which generates a second search result. Both locations of the first and second search results may be maintained (e.g., as separate search snapbacks for that window), such that the user may be able to hop back to either search result without having to go through all intermediate pages.

In one embodiment, the locations of first and second search results may be maintained in a first-in-last-out (FILO) mechanism (for, e.g., the particular window displaying the search result). They may be stored in a FILO queue, similar to a stack. When a user activates a search result snapback functionality via one of the aforementioned methods, the system may snapback to a search result from a latest recorded location stored in the FILO queue and the respective recorded location is reset when the corresponding presentation is presented. When the user activates the search result snapback functionality again, a presentation corresponding to the latest recorded location available in the FILO queue will be retrieved and presented to the user.

For example, when a user accesses a first and a second search result pages, corresponding first and second locations are recorded and the first and second locations are maintained in a FILO manner (e.g., pushed into a FILO queue). Subsequently, when a user activates a search result snapback functionality, the second recorded location (e.g., the latest recorded location) is retrieved (e.g., popped out from the FILO queue) and the second search result page is retrieved and displayed based on the second recorded location. When the second search result page is displayed, its corresponding second recorded location is reset (e.g., cleared from the FILO queue). Since there are more recorded locations maintained (e.g., the first recorded location is still in the FILO queue), the search result snapback functionality is still available (e.g., the search result snapback button is still displayed or the corresponding snapback item is still enabled). As a result, when a user activates the search result snapback functionality again via one of the aforementioned methods, the next latest recorded location available from the FILO queue (e.g., the first recorded location) is retrieved and the first search result page is retrieved and displayed based on the first recorded location.

Similarly, multiple recorded locations may be maintained in the page snapback functionality. For example, a user may browse multiple related document presentations and may wish to record those locations of the related document presentations. As a result, the user may be able to snapback (e.g., jump) between those related document presentations for certain purposes, such as, for example, a comparison of the contents.

In one embodiment, multiple snapback buttons or multiple items of a snapback menu may be implemented for the page snapback and search result functionalities. Each of the multiple snapback buttons or items is related to each of the multiple recorded locations. As a result, at least one of them may function as a "snapforward" functionality, such that a user is able to hop around, in backward or forward manner, among the recorded document presentations or search results without having to go in sequence through the presentations.

Accordingly, an exemplary method includes selectively recording a plurality of locations of a plurality document presentations, the plurality of recorded locations including a first and a second recorded locations, displaying one or more further document presentations, and displaying a second document presentation from a second recorded location in response to a second input, without having to select from a menu of document presentations and without having to go back in sequence through the further document presentations.

Furthermore, in addition to page snapback functionality, according to one embodiment, snapback functionality is also available for a search result page delivered by a search engine. When a linked document is accessed from a search result, a search result snapback functionality is available to that search result. A user may snapback to the search result page by clicking a corresponding search result snapback button, such as snapback button 708, or alternatively, by selecting a corresponding item, such as snapback command item 714, from menu 718, as shown in FIG. 7A. In one embodiment, the page snapback and search result snapback functionality may operate independently. The search result snapback functionality will be described below.

According to one embodiment, the snapback interface may also be incorporated with a search mechanism. In general, after a user issues a search request to a search engine or search facility (e.g. Google or Yahoo or other such engines or facilities) and a search result is displayed in window, the user may further access one or more linked documents listed in the search result. After browsing the one or more linked documents, the user typically wants to go back to the search result to browse another linked document from the search result (e.g. a Google search result page). In a conventional interface, a user has to use a backward button and has to go through all of the intermediate pages in order to go back to the search result (or alternatively, select the search result page from a menu which lists the intermediate pages and the search result page). With a snapback interface presented by an embodiment of the invention, a user who accesses the subsequent one or more linked documents from the search result may directly snapback to the search result without having to go through the intermediate pages.

Figure 9A:
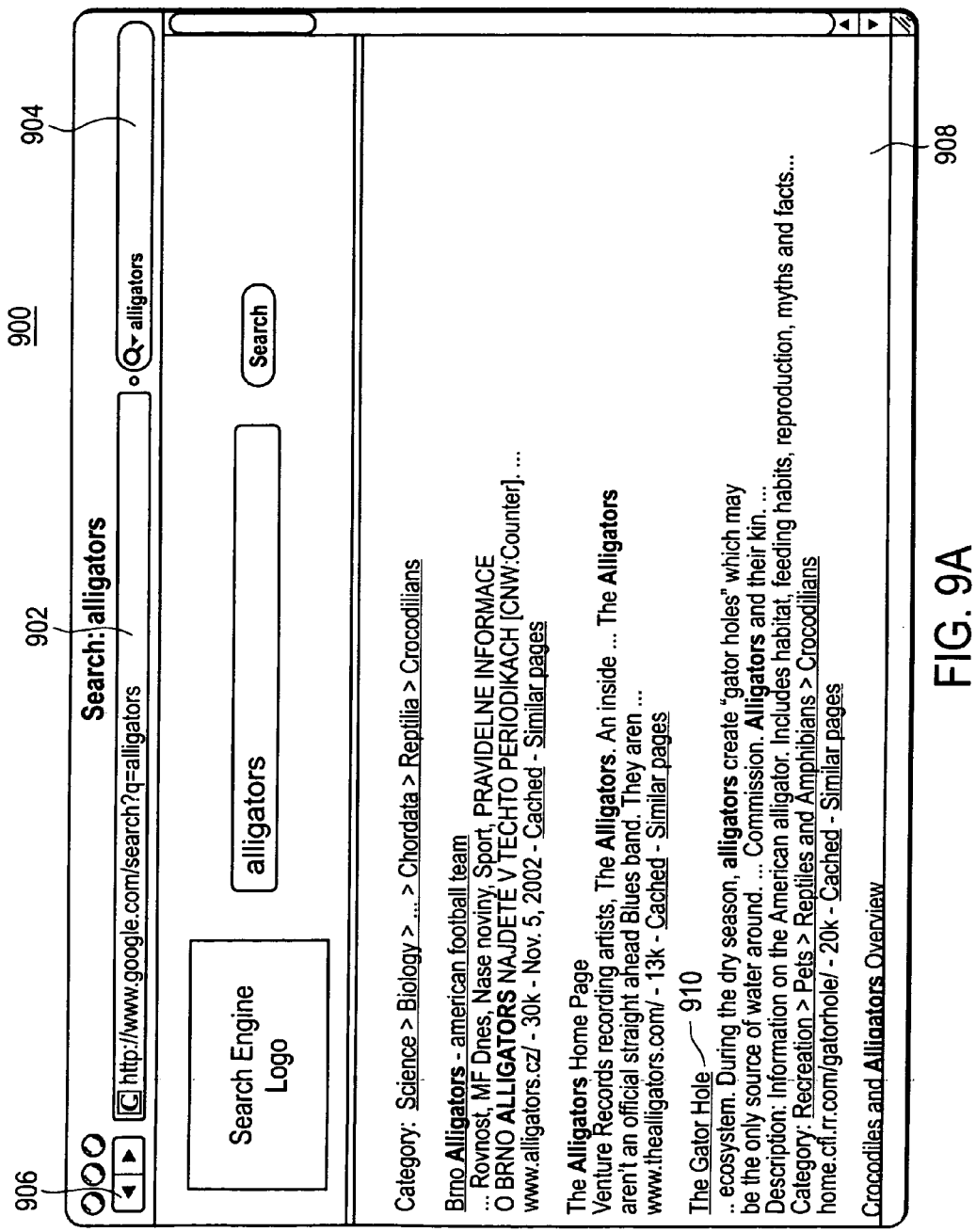
Figure 9C:
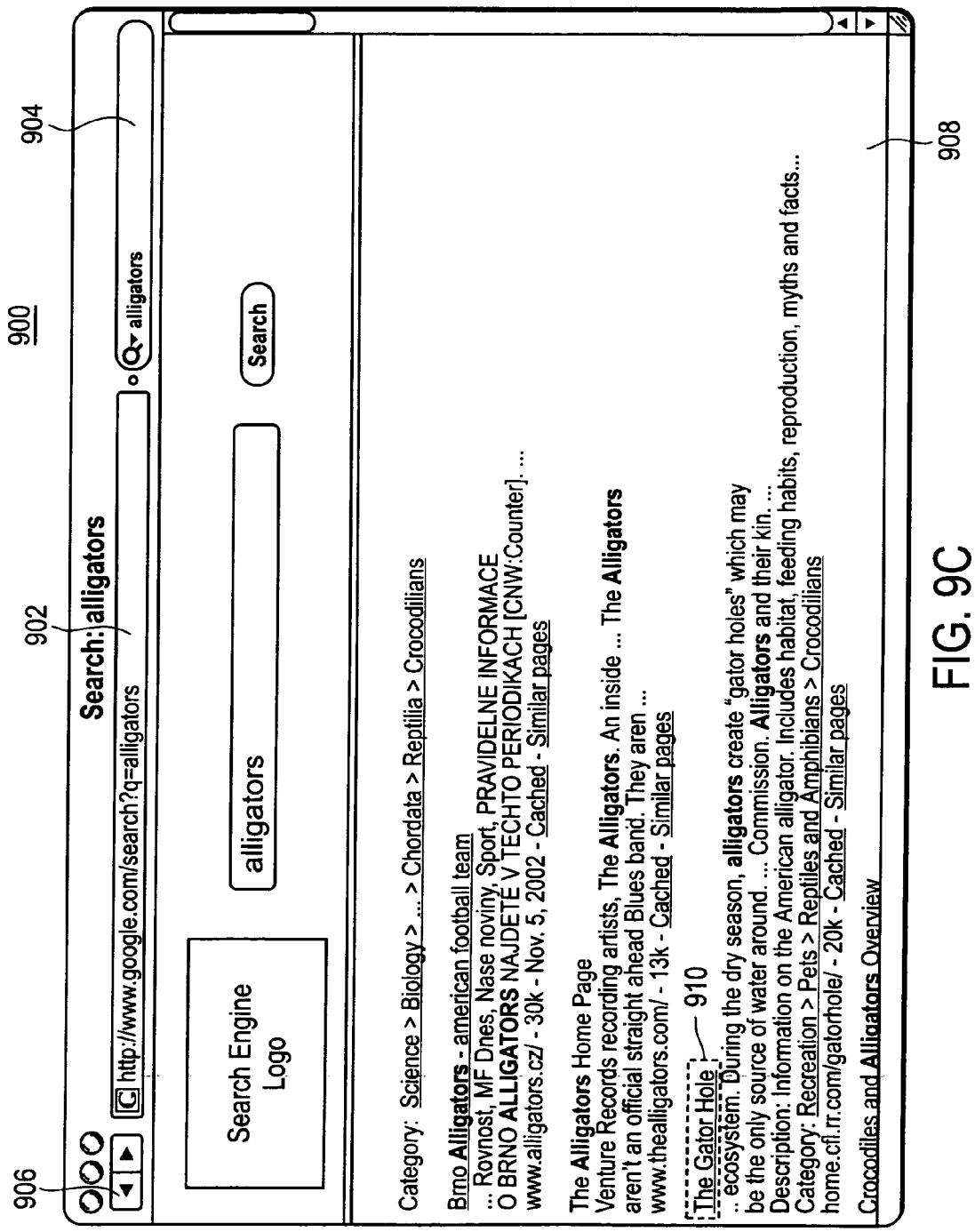

FIGS. 9A to 9C show block diagrams illustrating a snapback interface incorporated with a search facility in accordance with one embodiment of the invention. Referring to FIG. 9A, the GUI 900 includes, among others, an address field 902 and a search field 904. The search field 904 allows a user to enter a word or phrase to be searched by a search facility and a search result is delivered by the facility and displayed in the window 908. When a user obtains access to one or more linked documents from the search result, such as linked document 910, the corresponding linked document is displayed in the window 908, as shown in FIG. 9B. In addition, since the displayed document presentation is not a search result page any more, a snapback functionality is enabled for the search result displayed in FIG. 9A. In one embodiment, a snapback button 912 is displayed in the search field. It would be apparent to those with ordinary skill in the art that the snapback button 912 may be positioned at other locations within the GUI 900, such as, for example, at a status bar at the bottom of the GUI (not shown). In an alternative embodiment, a snapback command item in a menu, such as snapback item 714 of menu 718 shown in FIG. 7A, is enabled.

It would be appreciated that a user may access a sequence of multiple pages before reaching the page displayed in FIG. 9B. In a conventional interface, a user has to use a backward button, such as button 906 and has to go through all the intermediate pages in order to snapback to the search result. With the snapback interface, according to one embodiment, when a user activates the snapback interface, by either clicking the snapback button 912 or by selecting a snapback item 714 from the menu 718, the system directly snapbacks to the search result without having to go through the intermediate pages in between, as shown in FIG. 9C.

Figure 10A:
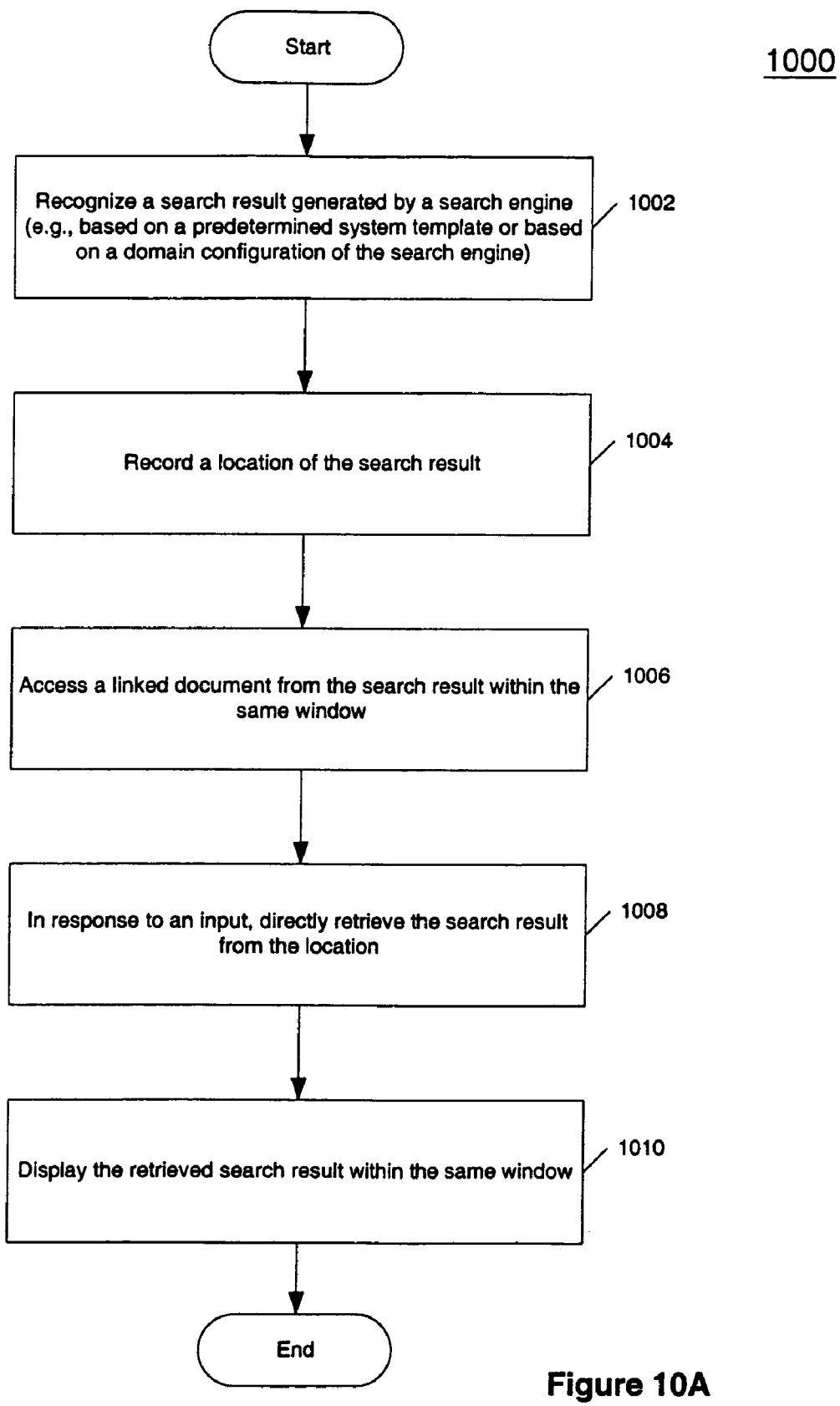
FIGS. 10A and 10B are flow diagrams illustrating exemplary search snapback processes in accordance with one embodiment of the invention.

FIG. 10A is a flow diagram illustrating an exemplary snapback process incorporated with a search facility in accordance with one embodiment of the invention. Referring to FIG. 10A, when a user issues a search request to a search engine and receives a search result (e.g. a Google search result page), at block 1002, the system recognizes the search result based on a predetermined system template or a domain configuration of a search facility. At block 1004, a location of the search result is recorded when the search result is recognized. At block 1006, a user accesses a linked document from the search result. At block 1008, in response to an input, the system directly retrieves the search result from the recorded location and at block 1010, displays it in the same window.

Figure 10B:
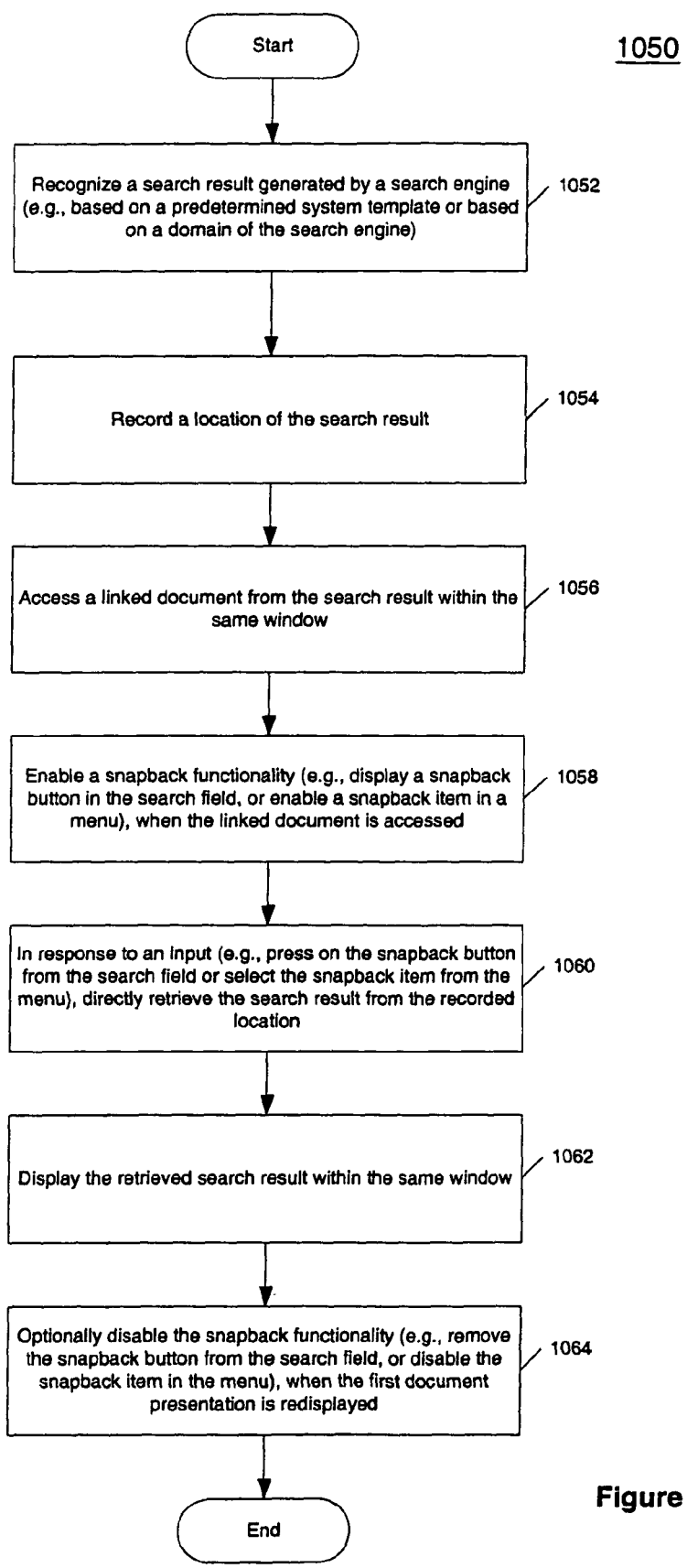

FIG. 10B is a flow diagram illustrating an exemplary snapback process incorporated with a search facility in accordance with another embodiment of the invention. Referring to FIG. 10B, when a user issues a search request to a search engine and receives a search result, at block 1052, the system recognizes the search result. In one embodiment, the search result is recognized based on a template related to the search facility. For example, according to one embodiment, the search result may be recognized by a template, such as a template having a string of "search?q=", as shown in the address field 902 of FIG. 9A. The template may be incorporated into the application. Alternatively, the template may be configurable by a user prior to launching the application. For example, the template may be configured via a script by a user and the script may be loaded when the application is launched. As a result, the application is able to adjust to a template specifically designed for a specific search facility without modifying the source code of the application and without having to recompile the source code to rebuild the binary image of the application. In an alternative embodiment, the search result is recognized via a domain configuration (e.g., domain name or domain address, etc.) of the search facility. In a further embodiment, the GUI may include a configuration interface, such as a "setup" utility, to allow a user to dynamically configure or set up a template related to a search facility. Furthermore, the GUI may be pre-configured with an OEM (original equipment manufacturer) version for a specific search facility in a distributed application environment.

Once the search result is recognized, at block 1054, the location of the search result is recorded. At block 1056, a user may access one or more linked document presentations from the search result. When the one or more linked document presentations are accessed, at block 1058, a search snapback functionality is enabled. In one embodiment, a search snapback button is displayed in the search field, such as, for example, snapback button 912 of FIG. 9B. In an alternative embodiment, a snapback item is enabled or made available in a menu, such as snapback item 714 of menu 718 in FIG. 7A. In response to an input, at block 1060, the system directly retrieves the search result from the recorded location and at block 1062, redisplays the search result in the same window. In one embodiment, the input is received either by clicking on the search snapback button or alternatively, by selecting a search snapback command item from a menu. After the search result is redisplayed, at block 1064, the snapback functionality is optionally disabled for the search result (e.g., the search result snapback button is removed from the display or the snapback item is disabled or grayed out in the menu).

Many of the search results delivered by a search facility contain multiple pages (e.g. many Google search result pages will be obtained for a search of "babies and women"). A user may browse through multiple search result pages and access one or more linked pages from one of the multiple search result pages. A typical user most likely wants to snapback to the last search result page where the one or more linked pages originated. According to one embodiment, the search snapback interface allows a user to directly snapback to the last search result page the user visited from a linked document presentation without having to go through all the intermediate linked pages. As a result, a recordation of the last search result page accessed would reset or supercede a previous recordation of previous search result pages.

Figure 11A:
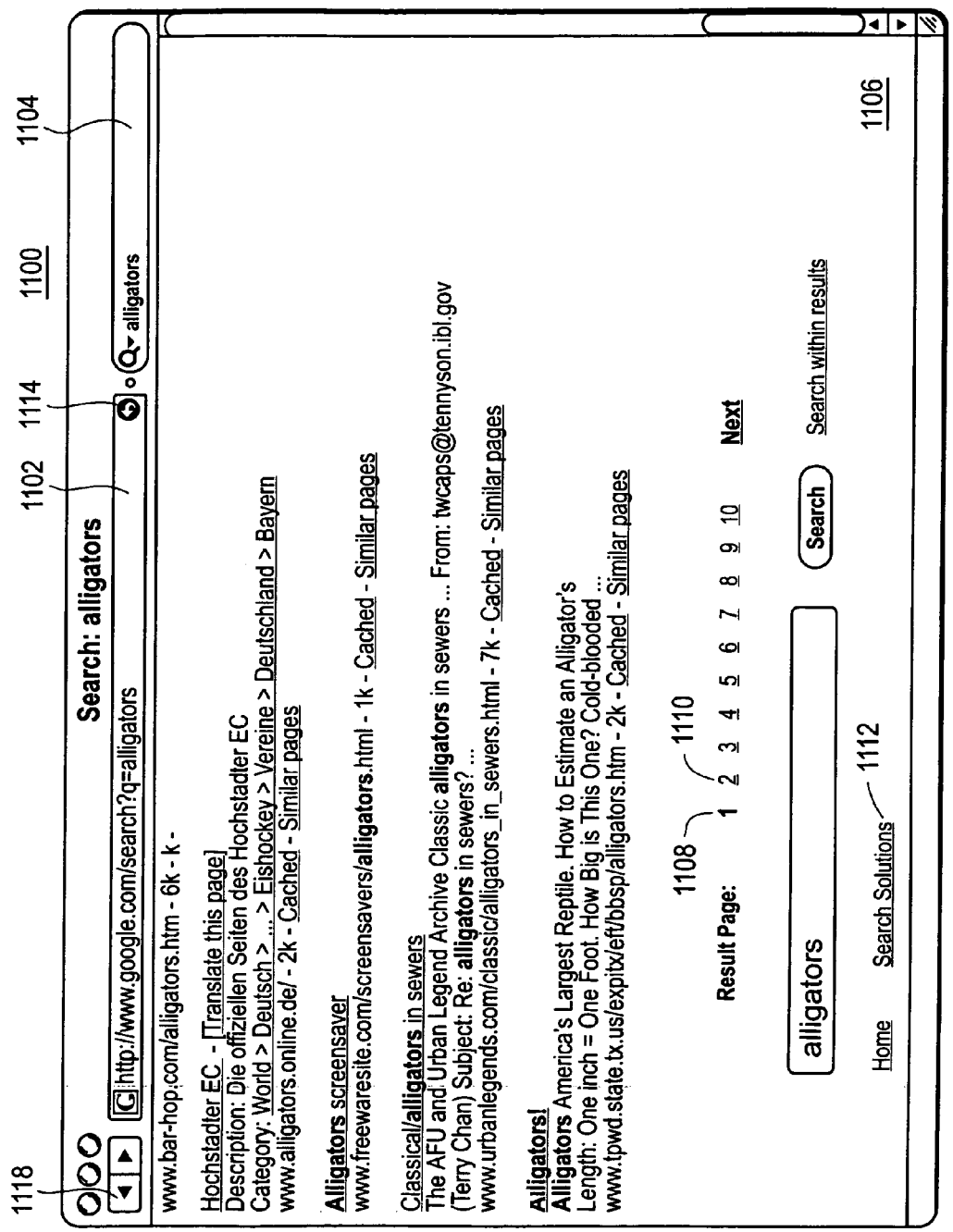
FIGS. 11A to 11E show a GUI illustrating an exemplary search snapback interface in accordance with another embodiment of the invention.

FIGS. 11A to 11E show an exemplary GUI illustrating a snapback interface handling multiple search results pages in accordance with one embodiment of the invention. Referring to FIG. 11A, in one embodiment, the exemplary GUI 1100 includes, among others, an address field 1102 with a corresponding snapback button 1114 which is present when a page snapback location is recorded, a search field 1104 with a corresponding snapback button 1116 (shown in FIG. 11C) which is present when a search snapback location is recorded, and a display window 1106 that displays a document page corresponding to an address entered in the address field 1102 or a search result corresponding to a search request entered into the search field 1104. In this embodiment shown in FIG. 11A, a search result is displayed in the window 1106 in response to a search request entered in the search field 1104. The search result displayed may include multiple search result pages, such as pages 1108 and 1110. In the embodiment as shown in FIG. 11A, a first search result page 1108 is displayed in the window 1106. Furthermore, the search facility may include one or more internal links or menus, such as link 1112.

According to one embodiment, when a first search result page 1108 is recognized and displayed in the window 1106, as shown in FIG. 11A, a first location of the first search result page 1108 is automatically recorded by the system. In one embodiment, the search result is recognized based on a template related to the search facility. For example, according to one embodiment, the search result may be recognized by a template of "search?q=", as shown in the address field 1102. The template may be incorporated into the source code software of the application. Alternatively, the template may be configurable by a user prior to launching the browsing application. For example, the template may be configured via a script by a user and the script may be loaded when the browsing application is launched. As a result, the application is able to adjust to a template specifically designed for a specific search facility without modifying the source code of the application and without having to recompile the source code to rebuild the binary image of the application. In an alternative embodiment, the search result is recognized via a domain configuration (e.g., domain name or domain address, etc.) of the search facility. In a further embodiment, the GUI 1100 may include a configuration interface, such as a "setup" utility, to allow a user to dynamically configure or set up a template related to a search facility. Furthermore, the GUI 1100 may be pre-configured with an OEM (original equipment manufacturer) version for a specific search facility in a distributed application environment.

Referring back to FIG. 11A, after receiving a search result from a search facility in response to a search request entered into a search field 1104 of the GUI 1100, the first search result page 1108 of the search result is displayed in the window 1106. Prior to displaying the search result page 1108, a user may have accessed a document (e.g., a Web page) via the window 1106 based on an address entered into the address field 1102 and the location of the respective document has been recorded automatically or manually by a user. When the first search result page 1108 is displayed in the window 1106, according to one embodiment, a page snapback functionality is enabled for the original document accessed related to the address entered into the address field 1102 (not shown), since the original document is no longer displayed. In the embodiment shown in FIG. 11A, a page snapback button 1114 is displayed in the address field 1102 to allow the user to snapback to the web page which was displayed before the first search result page 1108 was displayed. In addition, a page snapback command item in a menu, such as page snapback item 712 of menu 718 in FIG. 7A, is enabled, as well as its respective preprogrammed hotkey. As a result, a user is able to snapback to the original document before the search result is displayed, via an activation of the page snapback functionality, such as, for example, by clicking the snapback button 1114, selecting a page snapback item from a menu (e.g., item 712 of menu 718 in FIG. 7A), or pressing a predefined hotkey associated with the page snapback function.

Figure 11B:
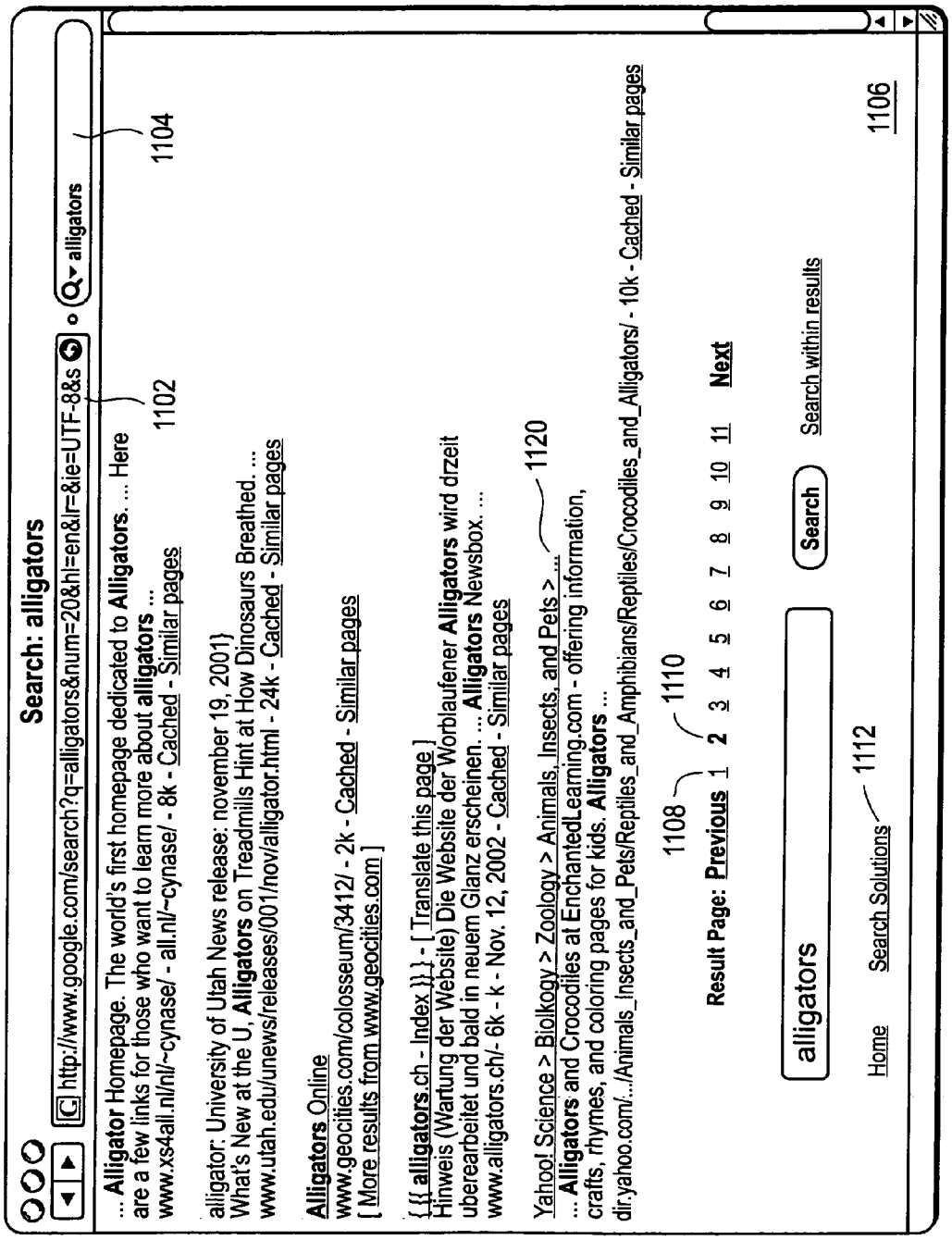

The search result may include multiple search result pages, such as pages 1108 and 1110. When a user clicks on one of the multiple search result link, such as page 1110, a corresponding or a second search result page is displayed, as shown in FIG. 11B. Since the second search result page is recognized by the application, the second location of the second search result page is recorded, resetting or superceding the previously recorded first location of the first search result page. As a result, when a user accesses one or more linked document from the second search result page, such as link 1120, the corresponding linked document is displayed in the window 1106, as shown in FIG. 11C.

Figure 11C:
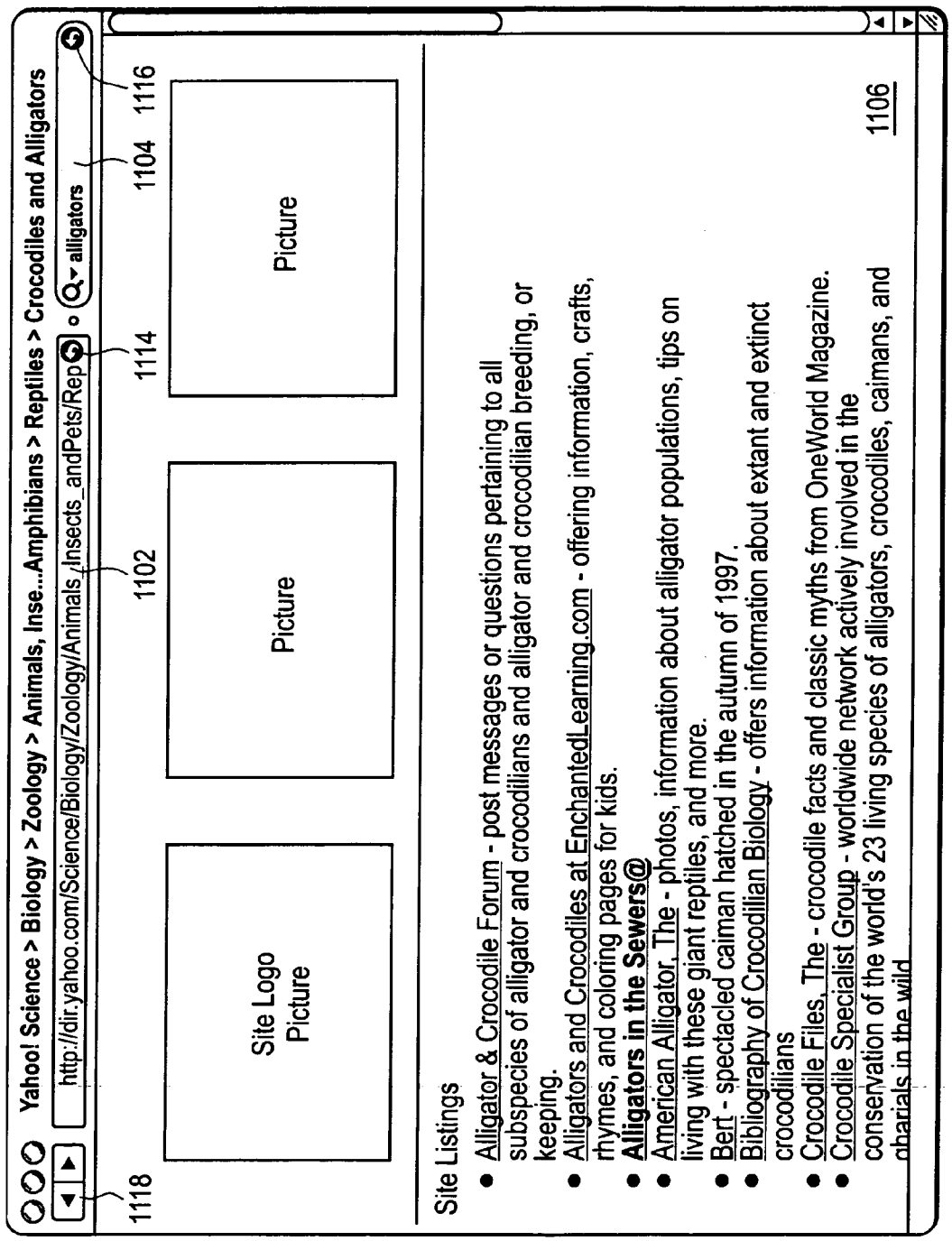
Figure 11D:
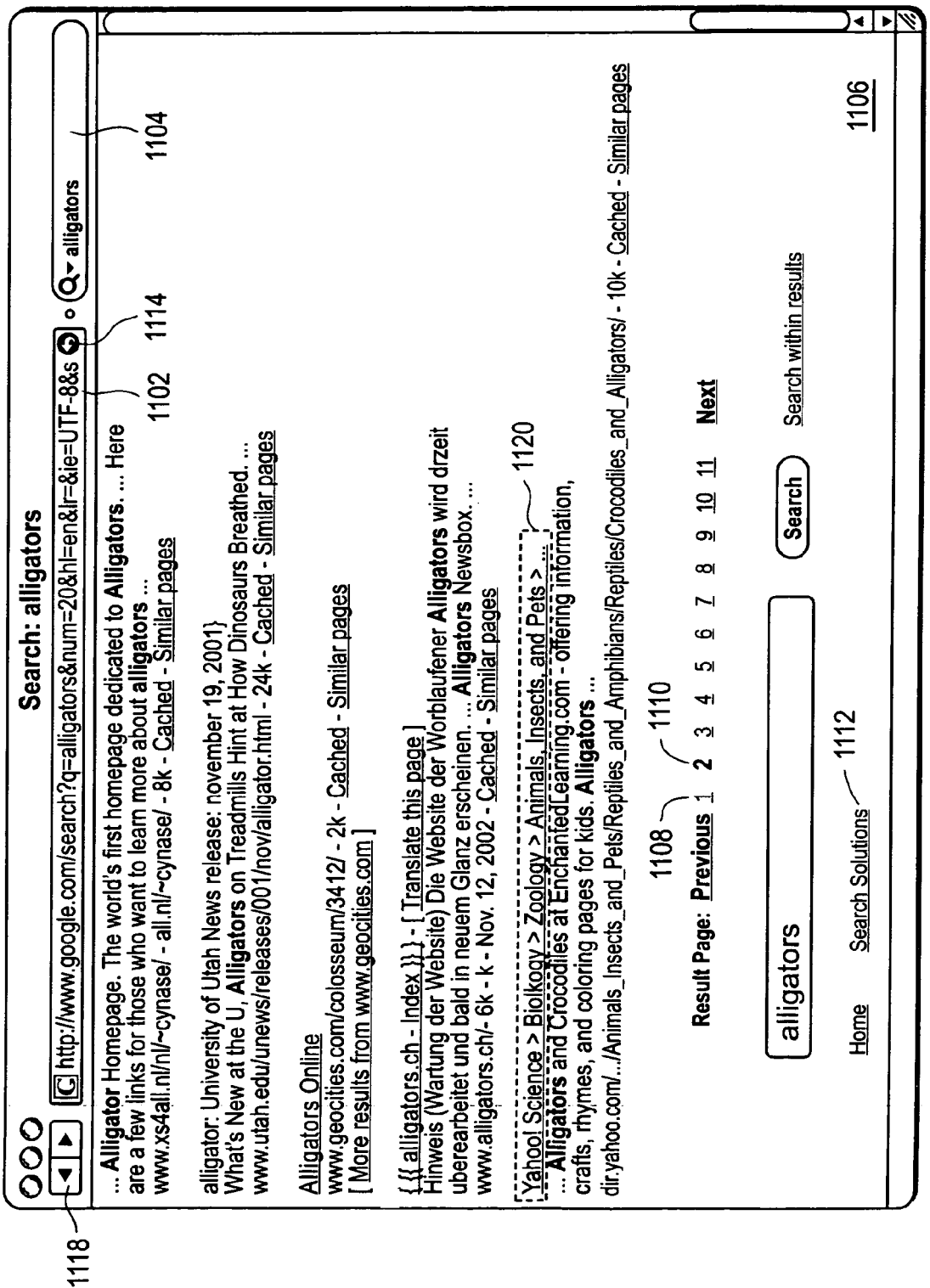

In addition, referring to FIG. 11C, according to one embodiment, since the linked document displayed is not a search result page (e.g., not recognized as a search result), a search snapback button 1116 is displayed in the search field 1104. It would be appreciated that both snapback buttons 1114 and 1116 may be positioned at other locations within the window. When the user activates the search snapback functionality via, for example, clicking the snapback button 1116, selecting a search snapback command item 714 of menu 718 in FIG. 7A, or a preprogrammed hotkey keystroke, the second search result page 1110 (instead of first search result page 1108) is redisplayed in the window 1106, as shown in FIG. 11D.

In a conventional GUI, a user has to use a backward button, such as button 1118, to go back to the previous page. Although the backward button 1118 still works for the backward purposes, the previous document page retrieved based on the backward button 1118 is the document page last accessed via the window 1106. It could be a document page accessed via an address entered into the address field 1102 or alternatively, it could be a search result page based on a search request entered into the search field 1104. A user has to go through all the intermediate pages in between in order to go back to the one he/she desires.

The page snapback interface and search snapback interface provided by the embodiments of the present invention allow a user to directly snapback to either a page accessed via an address entered into the address field 1102 or a search result page in response to a search result entered into the search field 1104, whichever he/she desires and these two functions may be independent. For example, according to one embodiment as shown in FIG. 11C, a user is able to snapback to a document page previously accessed via an address entered into the address field 1102 by clicking the corresponding page snapback button 1114, selecting a search snapback item 712 of menu 718 in FIG. 7A, or a preprogrammed hotkey keystroke associated with the snapback item 712. The previous document page accessed via the address entered into the address field 1102 is directly retrieved regardless all the intermediate pages in between.

Alternatively, according to another embodiment, a user is able to snapback to a search result page previously accessed via a search request entered into the search field 1104 (or entered in another field) by clicking the corresponding page snapback button 1116, selecting a search snapback item 714 of menu 718 in FIG. 7A, or a preprogrammed hotkey keystroke associated with the snapback item 714. The previous search result page accessed via the search request entered into the search field 1104 is directly retrieved regardless of all the intermediate pages in between.

It is noted that the page snapback interface (e.g., page snapback button 1114) and the search snapback interface (e.g., search snapback button 1116) may be made to operate independently, which will be described in detail further below. As a result, a user is able to directly and independently snapback to a document page he/she wants, either a previous page accessed via an address entered into the address field 1102 or alternatively, a previous search result page in response to a search result entered into the search field 1104, without having to go through all the intermediate pages previously accessed in order via a backward button such as backward button 1118.

Figure 11E:
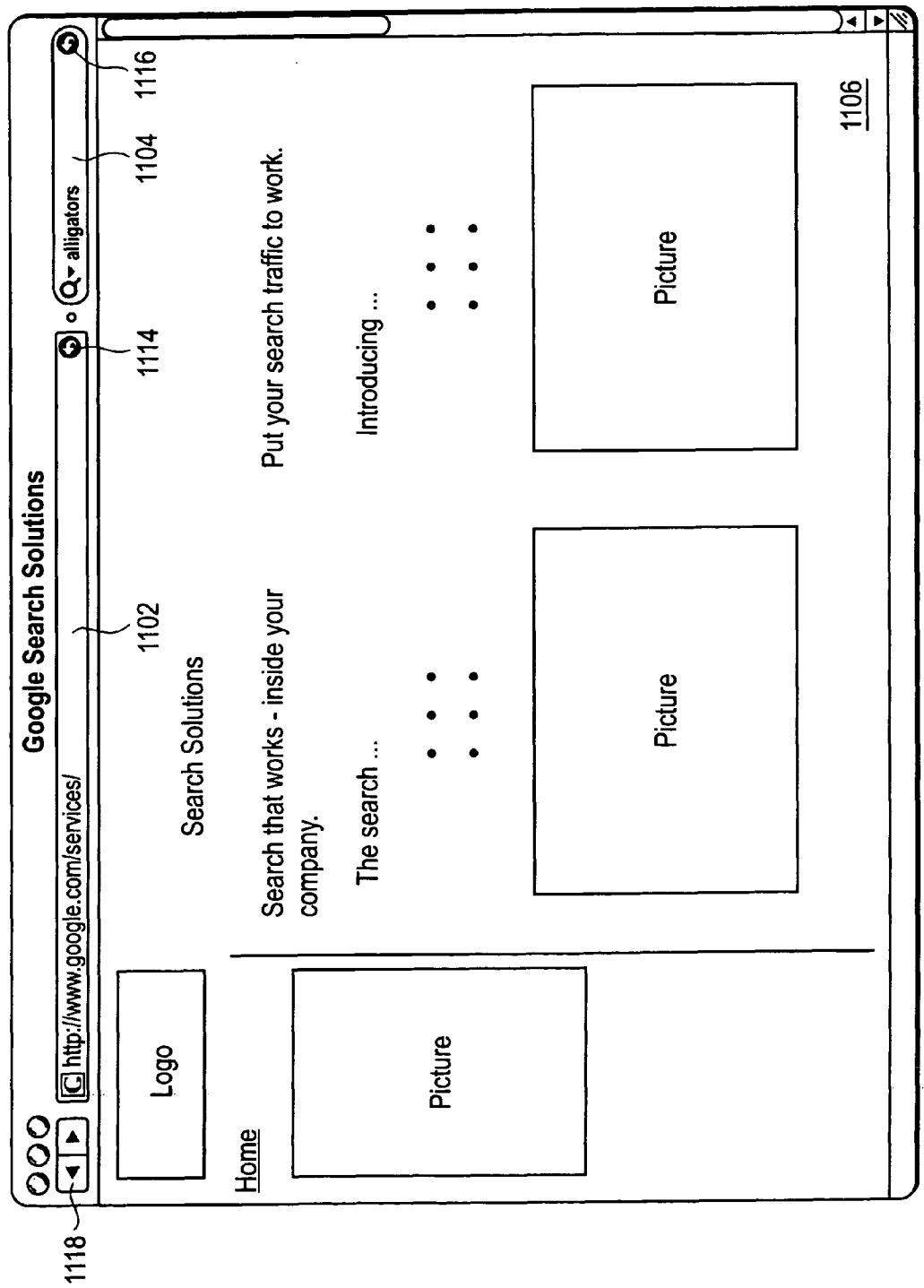

Furthermore, according to one embodiment, it is desirable to be able to recognize a search result delivered from a search facility because the search snapback interface only records a location of a search result as a search snapback location. As a result, when a user accesses document pages other than a search result page, the location of those document pages are not recorded as a search snapback location, even if those document pages are maintained by the search facility. For example, according to one embodiment as shown in FIG. 11D, when a user accesses a document page, such as document page 1112, other than a search page (e.g., search result page 1108 or 1110), the location of the document page 1112 is not recorded as a search snapback location even though it is maintained by the corresponding search facility. When the document page 1112 is displayed in the window 1106, as shown in FIG. 11E, a search snapback button 1116 is displayed or enabled since the document displayed is no longer a search result page (and thus the user can snapback to the search result page using button 1116).

Although locations of document pages other than search result pages are not recorded by the search snapback interface, they could, however, be recorded by the page snapback interface in the manner described above, e.g. in response to a user request, by selecting an item to mark a current page for page snapback, such as item 710 of menu 718 in FIG. 7A. As described above, the page snapback interface and the search snapback interface are operating independently in at least some embodiments, such that a user is able to directly and independently snapback to a document page he/she wants or a search result page, either a previous page accessed via an address entered into the address field 1102, a previous search result page in response to a search result entered into the search field 1104 or, alternatively, a non-search result document originated from a search result page, without having to go through the intermediate pages previously accessed in order via a backward button such as backward button 1118.

Figure 12:
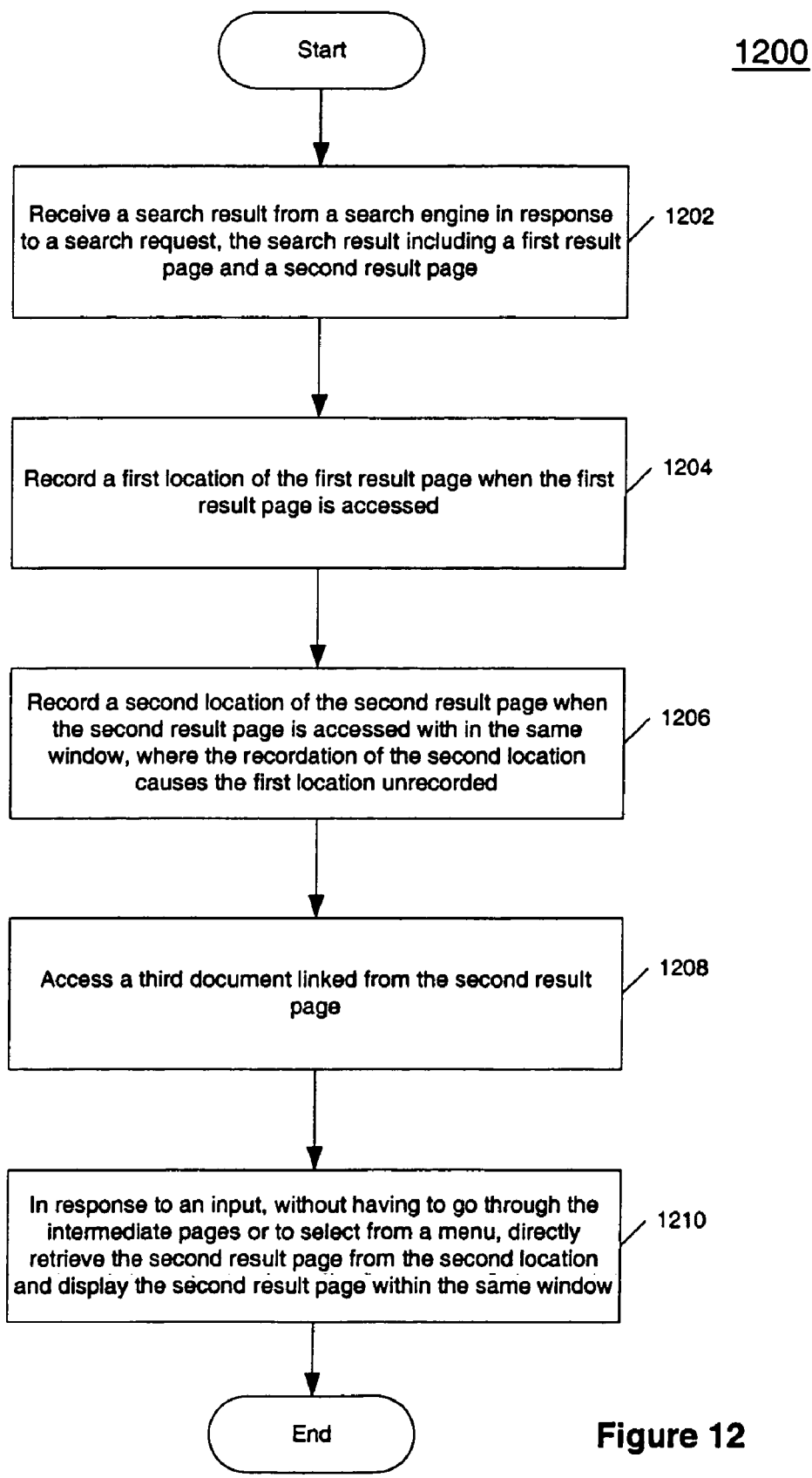
FIG. 12 is a flow diagram illustrating an exemplary search snapback process in accordance with another embodiment of the invention.

FIG. 12 shows a flow diagram illustrating an exemplary snapback process with a search result having multiple search result pages, in accordance with one embodiment of the invention. In one embodiment, the exemplary process 1200 includes receiving a search result from a search engine in response to a search request, the search result including a first search result page and a second search result page, recording a first location of the first search result page when the first search result page is accessed via a window, and recording a second location of the second search result page when the second search result page is accessed via the window, wherein the recordation of the second location causes the first location to be unrecorded.

Referring to FIG. 12, when a user initiates a search request to a search facility (e.g., via entering the search request into a search field), at block 1202, a result is received and recognized by the search snapback interface based on either a template or a domain configuration of the search facility, as described above. The search result includes a first search result page and a second search result page. At block 1204, a location of the first search result page is recorded when the first search result page is displayed. When the user accesses the second search result page, at block 1206, a second location of the second search result page is recorded. The recordation of the second location resets or supercedes the recorded first location. As a result, the first location becomes unrecorded such that use of a snapback button or command does not result in the display of the document associated with the first location. Subsequently, at block 1208, the user accesses a third document linked from the second search result page. In response to an input, at block 1210, without having to go through all the intermediate pages, the system directly retrieves the second search result page (instead of the first search result page) from the recorded second location and displays it in the window. The input may be received via the corresponding search snapback button, a corresponding search snapback command item from a menu, or a preprogrammed hotkey associated with the search snapback item, as described above.

As described above, the page snapback interface and the search snapback interface are operating independently in at least some embodiments. When the page snapback interface is activated, a previously accessed document presentation is directly retrieved from a respective recorded location and displayed in the window. When the search snapback interface is activated, a last accessed search result page is directly retrieved from a respective recorded location and displayed within the same window. The two interfaces are available concurrently in the same window in these embodiments.

Figure 13A:
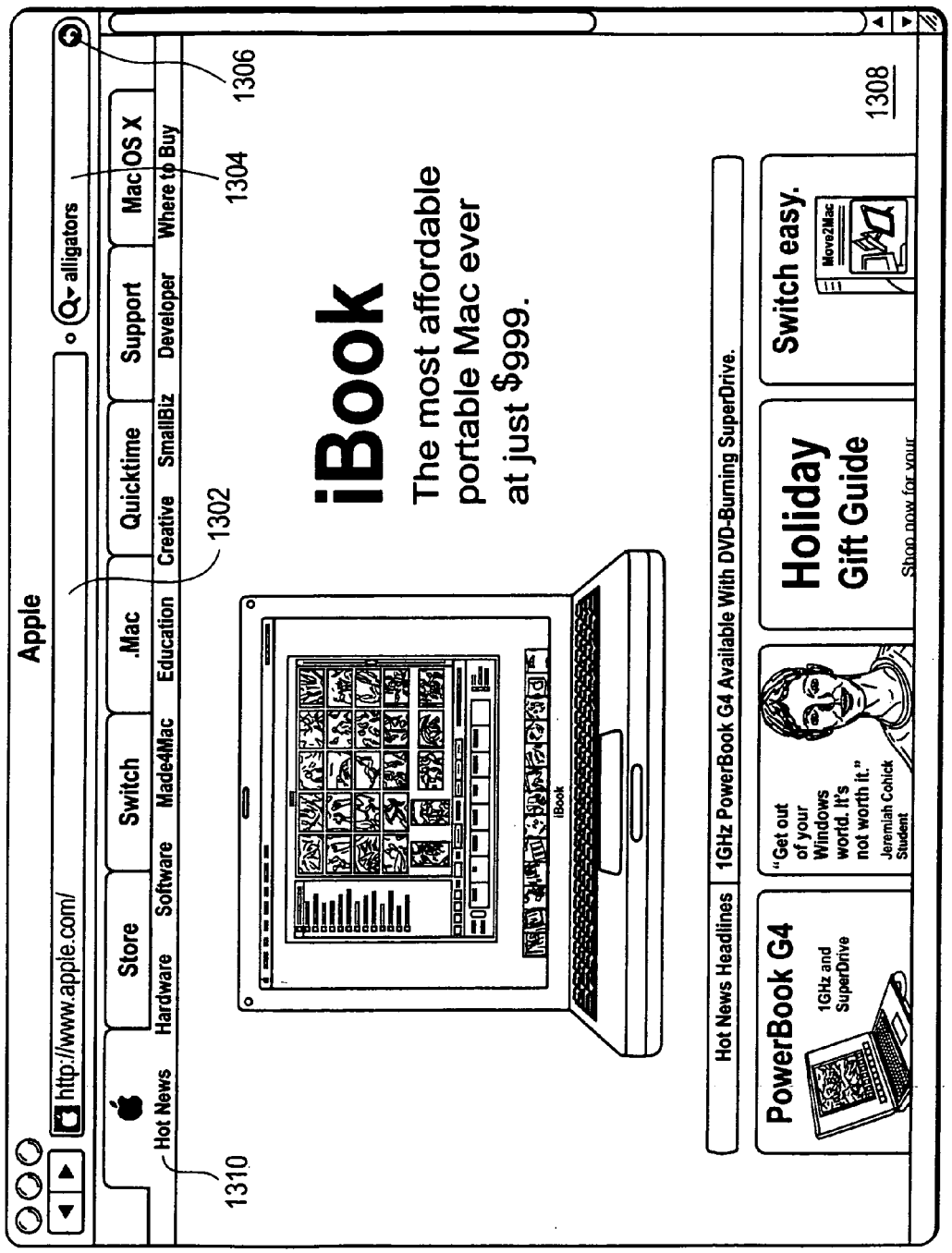
FIGS. 13A to 13D show a GUI illustrating exemplary page and search snapback interfaces operating independently, according to one embodiment of the invention.

FIGS. 13A to 13D show a GUI illustrating an exemplary page and search snapback interfaces operating independently in accordance with one embodiment. Referring to FIG. 13A, according to one embodiment, the exemplary GUI 1300 includes, among other features, an address field 1302, a search field 1304, and a window 1308 to display either a document presentation corresponding to an address or a search result in response to a search request entered into the search field 1304. In the embodiment shown in FIG. 13A, prior to displaying the document presentation in the window 1308 in response to an address entered into the address field 1302 (of which its location is recorded via processes discussed above), the user has conducted a search by entering a search request into the search field 1304 (or into another field in other embodiments) and a search result has been displayed in the window 1308. As a result, when the document presentation is accessed based on the address entered into the address field 1302, a search snapback button 1306 is displayed in the search field 1304. In addition, a corresponding search snapback item in a menu may also be enabled or made available as well as its associated preprogrammed hotkey, such as, for example, the search snapback item 714 of menu 718 with its associated preprogrammed hotkey shown in FIG. 7A.

Figure 13B:
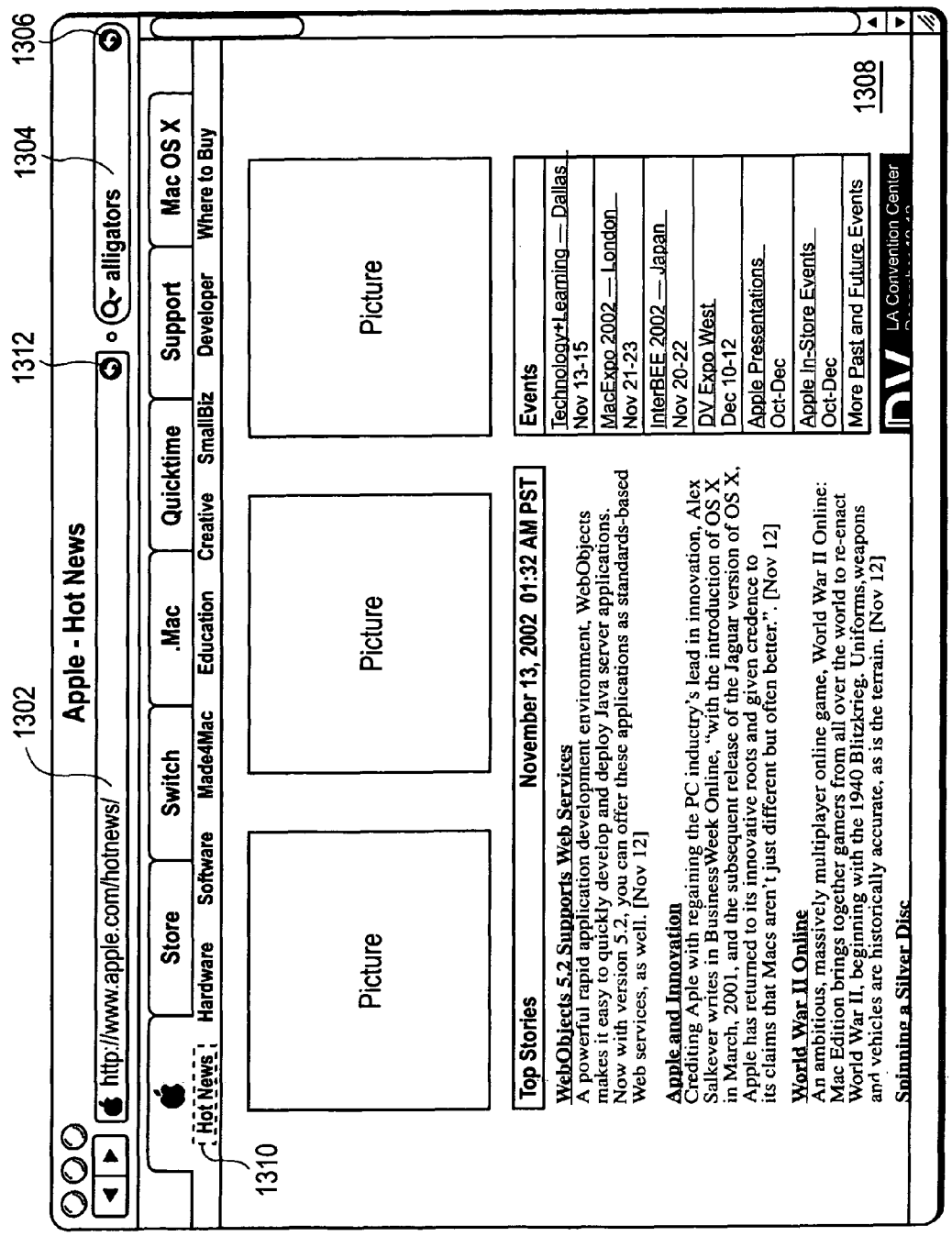

According to one embodiment, when a user further accesses one or more document presentations originated from the document presentation displayed in FIG. 13A, such as linked document 1310 and the corresponding linked document presentation is displayed within the same window 1308, as shown in FIG. 13B, a page snapback button 1312 is displayed as a result. In addition, after a search result page is displayed in the window a corresponding search snapback item in a menu may also be enabled or made available as well as its associated preprogrammed hotkey, such as, for example, the page snapback item 712 of menu 718 with its associated preprogrammed hotkey shown in FIG. 7A.

Figure 13C:
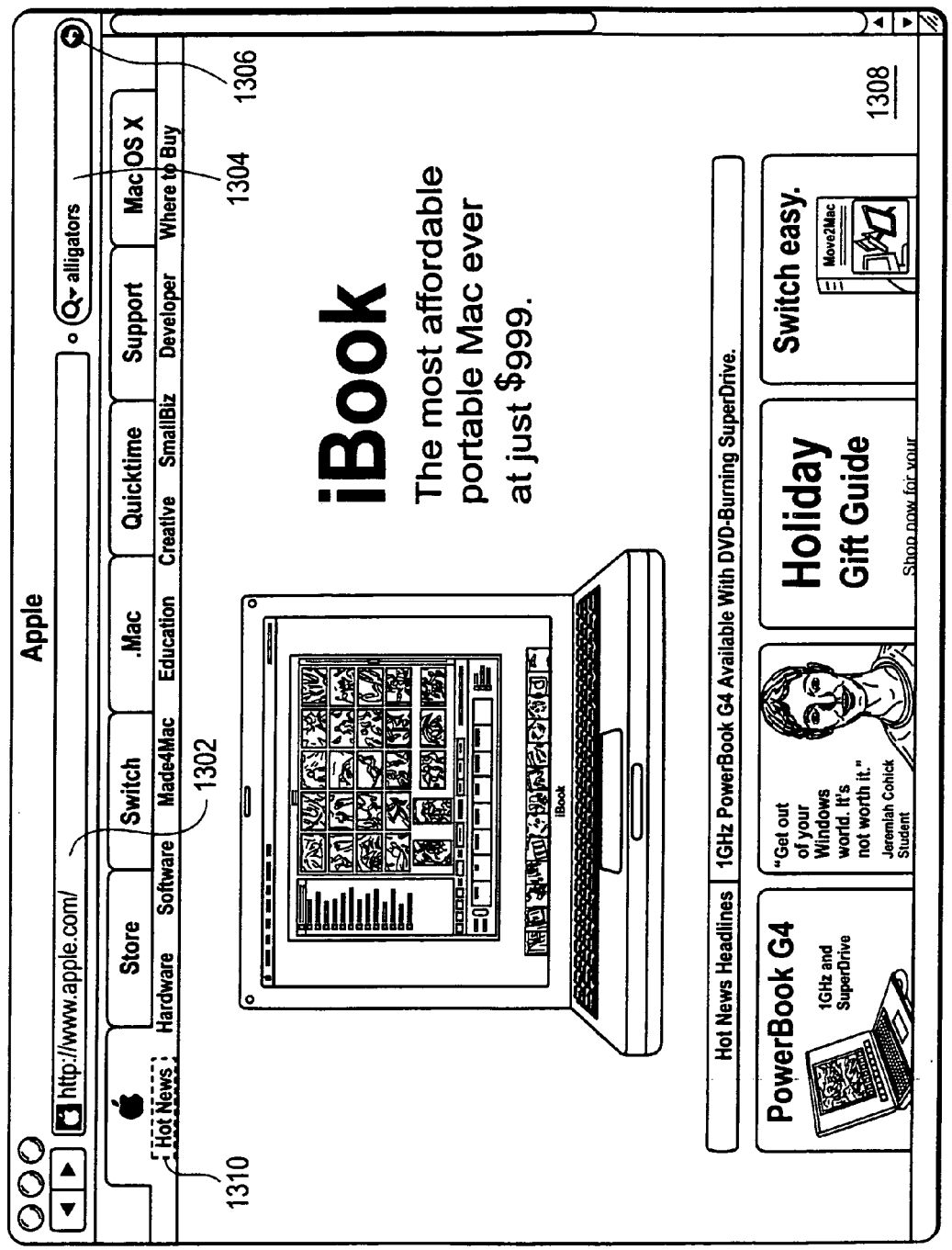
Figure 13D:
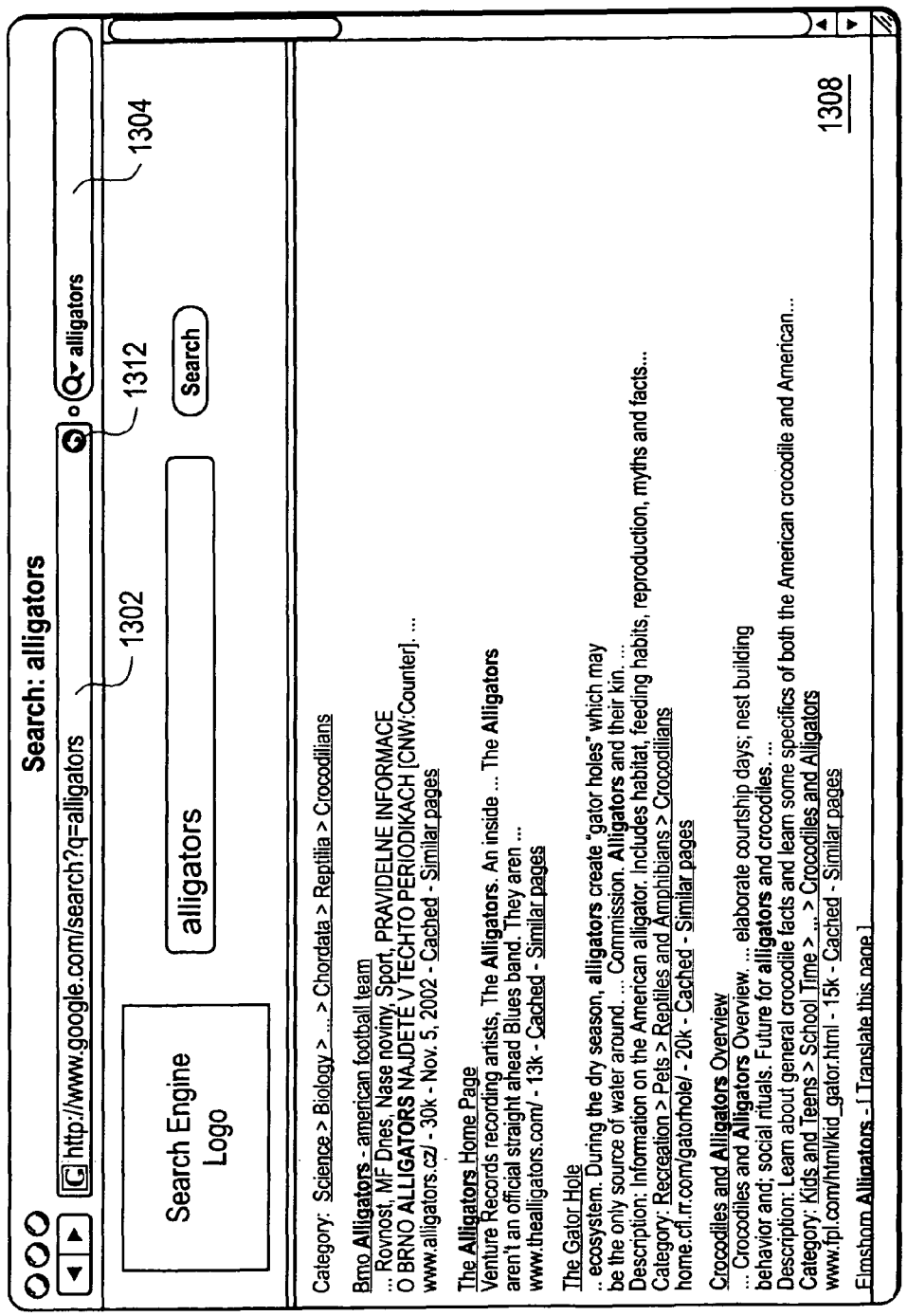

Subsequently, when a user activates the page snapback interface, such as clicking the page snapback button 13, selecting from the corresponding page snapback item 712 from the menu 718, or via an associated preprogrammed hotkey, the original document presentation is directly retrieved, without having to go through all the intermediate pages, and displayed in the window 1308, as shown in FIG. 13C. Optionally, as shown in FIG. 13C, when the original document presentation is redisplayed, the page snapback interface previously enabled for that original document presentation is disabled or made unavailable. It is important to note that a separate and independent search snapback button 1306 and its corresponding menu item from a menu (e.g., item 714 of menu 718 of FIG. 7A) are still available because the document presentation displayed is not a search result previously conducted. Therefore, when a user further activates the search snapback interface by either clicking the search snapback button 1306 or by selecting its corresponding search snapback item from a menu (e.g., item 714 of menu 718 of FIG. 7A), the previous search result page is displayed from its corresponding recorded location in the window 1308, as shown in FIG. 13D. It is useful to note that since the search result is displayed within the same window 1308 overlaying the original document presentation shown in FIG. 13C, a page snapback button 1312 is redisplayed in the address field 1302. As a result, the page and search snapback interfaces are operating independently.

Figure 14A:
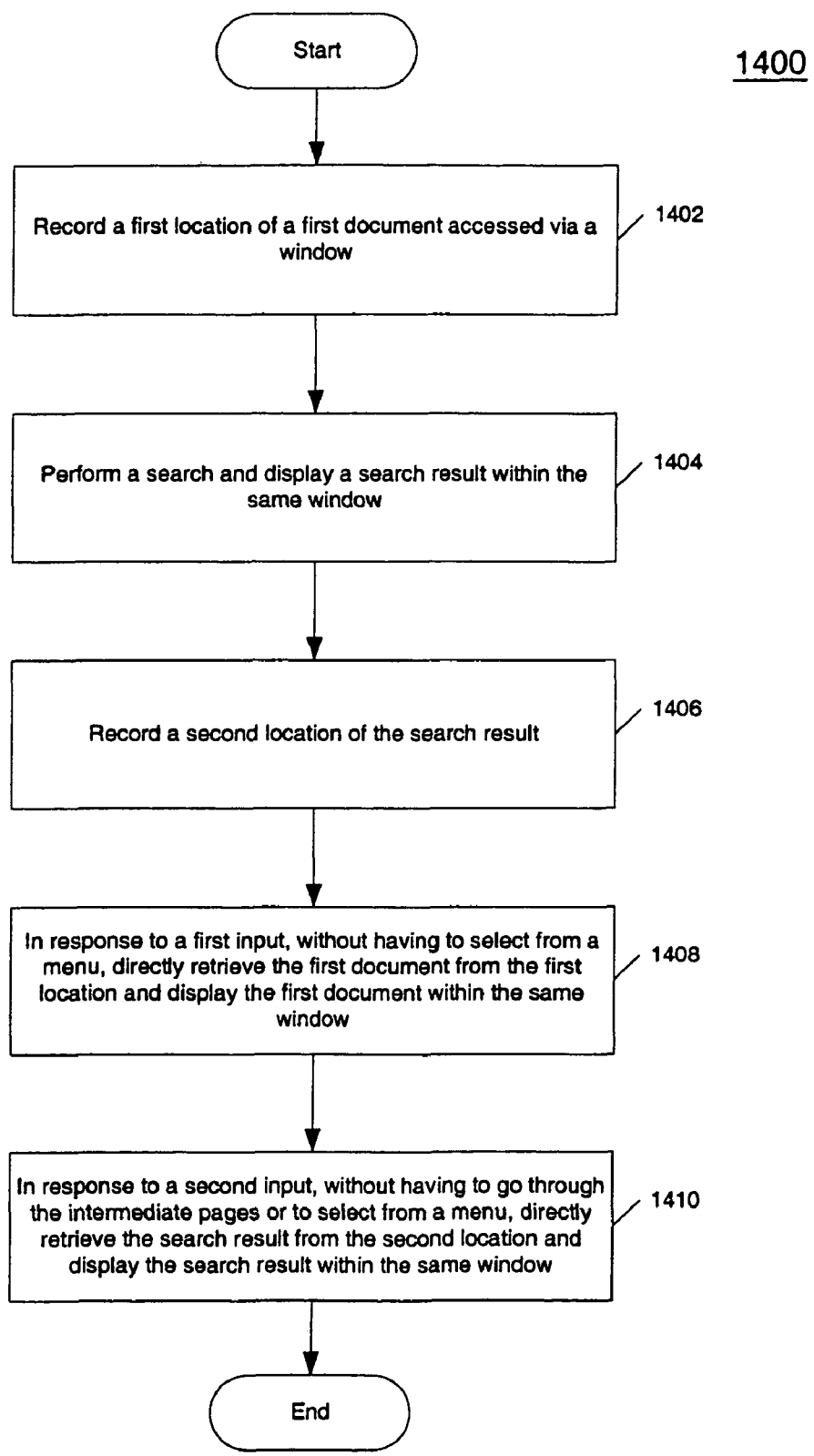
FIGS. 14A and 14B are flow diagrams illustrating exemplary page and search snapback processes operating independently, according to one embodiment of the invention.

FIG. 14A is a flow diagram illustrating exemplary independent page and search snapback interface processes in accordance with one embodiment. Referring to FIG. 14A, at block 1402, a first location of a first document presentation is recorded when the first document is accessed via a window. At block 1404, a search is conducted by a search facility in response to a search request and a search result is displayed in the window. At block 1406, a second location of the search result is recorded when the search result is displayed in the window. In response to a first input (e.g. clicking a page snapback button), at block 1408, without having to select from a menu of document presentations, the first document presentation is directly retrieved from the recorded first location and displayed within the same window. In response to a second input (e.g. clicking a search snapback button), at block 1410, without having to go through the intermediate pages, the search result is directly retrieved from the recorded second location and displayed within the same window.

Figure 14B:
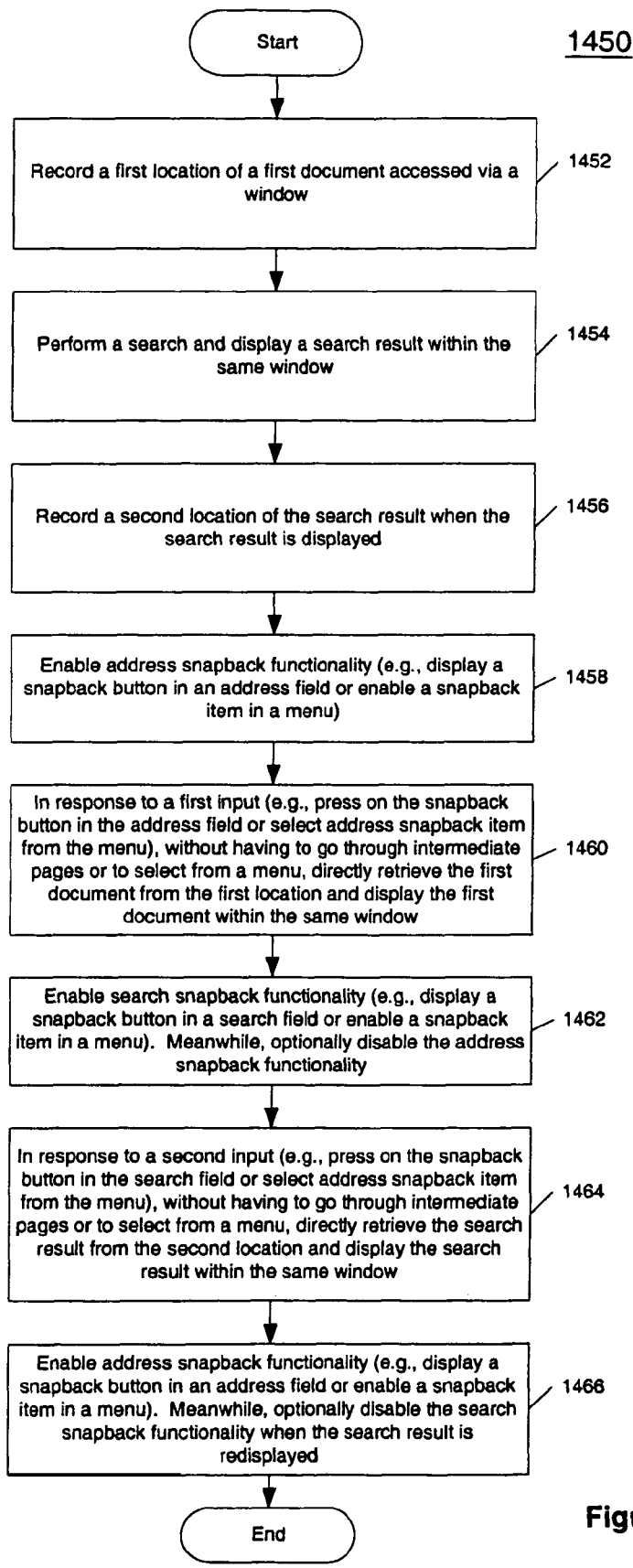

FIG. 14B is a flow diagram illustrating exemplary independent page and search snapback interface processes in accordance with another embodiment. Referring to FIG. 14B, at block 1452, a first location of a first document presentation is recorded when the first document is accessed via a window. The first location may be automatically recorded when the first document presentation is accessed via certain methods or manually recorded upon receiving a user request, as discussed above. At block 1454, a search is conducted by a search facility in response to a search request entered into a search field and a search result is displayed in the window. At block 1456, a second location of the search result is recorded when the search result is displayed in the window. In one embodiment, the second location of the search result is recorded when the search result is recognized via a predefined template or via a corresponding domain configuration of the respective search facility, as discussed above. At block 1458, a page snapback functionality is enabled or made available when the search result is displayed. In one embodiment, a page snapback button (e.g., snapback button 1312) is displayed. Alternatively, a page snapback item of a menu is enabled, such as item 712 of menu 718 shown in FIG. 7A.

In response to a first input, at block 1460, without having to go through the intermediate pages, the first document presentation is directly retrieved from the recorded first location and displayed within the same window. As discussed above, the first input may be received via an activation on the corresponding page snapback button, selecting a page snapback item from a menu, or pressing a preprogrammed hotkey. Alternatively, the first input may be received from a third party application via an inter-process API. Furthermore, the first input may be received from a remote client over a network. At block 1462, a search snapback functionality is enabled or made available to the search result when first document presentation is redisplayed in the window in response to the first input. In one embodiment, a search snapback button (e.g., snapback button 1306) is displayed. Alternatively, a search snapback item of a menu is enabled, such as item 714 of menu 718 shown in FIG. 7A. Meanwhile, the page snapback functionality associated with the first document presentation is optionally disabled or made unavailable to the user, since the first document presentation is redisplayed.

In response to a second input, at block 1464, without having to go through the intermediate page or select from a menu of items, the search result is directly retrieved from the recorded second location and displayed within the same window. As discussed above, the second input may be received via an activation on the corresponding search snapback button, selecting a search snapback item from a menu, or pressing a preprogrammed hotkey. Alternatively, the second input may be received from a third party application via an inter-process API. Furthermore, the second input may be received from a remote client over a network. Once the search result is redisplayed, at block 1466, the page snapback functionality is enabled or made available again and the search snapback functionality is disabled or made unavailable via the processes described above. As a result, the page and search snapback interfaces operate independently.

According to yet another embodiment, when a search result page is visited and the search result snapback point is updated (e.g., a location of the search result page is set for the search result snapback), the page snapback functionality is not available for the user (e.g., the page snapback button or its corresponding snapback items from a menu is disabled or removed from display), although the page and search result snapback functionalities are still conceptually operating independently. In one embodiment, by erasing the page snapback point when a search result page is visited, the page snapback button or corresponding snapback items of a menu will not appear until the next time the user does one of the above actions that initiate setting the page snapback point. Furthermore, according to another embodiment, setting the page snapback point may reset or clear the search result snapback point, or vice versa. It would be appreciated that such features (e.g., whether setting one snapback would reset or clear the other one) may be configurable by a user through a configuration utility.

In at least one exemplary embodiment, each window (e.g. a web browser window) in a group of windows (e.g. three web browser windows) has its own, independent page snapback interface or search snapback interface or both. For example, each of three web browser windows, open and running concurrently, may have a page snapback button and/or a search snapback button, and the operations of and locations of each of these buttons are independent. In particular, a first web browser window may have a page snapback set (by a resettable location of the snapback page) for a first web page and a search snapback location set for a first search result page while, at the same time and independently of the first web browser window, a second web browser window may have a page snapback set (by another resettable location which is associated with the second web browser window) for a second web page (which is different than the first web page) and a search snapback set (by a resettable location which is associated with the search snapback interface of the second web browser window) for a second search result page (which is different that the first search result page).

In a further embodiment, the snapback interfaces may be used in file system navigation. For example, a user may wish to browse a first portion of a storage image of a storage media (e.g., a first directory of files and folders such as subdirectories) and record the location of the first portion of the storage image. Subsequently, the user may browse a second portion of the storage image (e.g., a second directory). The user may activate the snapback functionality to snapback to the first portion from the second portion without having to select from a menu (e.g., a pulled down menu from an address bar). A conventional browser allows a user to go back up to its parent directory from the pulled down menu of the address bar. However, the user has to "walk through" all the child directories in between and they have to be in a parent-child directory relationship. The user may be required to remember the name of the directories. According to one embodiment of the invention, the snapback interfaces allow a user snapback from one directory to another directory, even though they are not in a parent-child directory relationship. Two directories may be unrelated and may be located within the same storage image. Alternatively, the two directories may be located at different storage images of different storage medias such as, for example, a remote storage over a network.

In addition, according to one embodiment, a user may conduct a search in a file system (e.g., searching for a file based on a filename or searching for a file containing a text string), while browsing the file system using a page snapback interface, and may receive a search result containing one or more subfolders in a resulting folder. When the user accesses one of subfolders, the user may snapback to the search result folder via the search result snapback interface. Alternatively, the user may snapback to the directory or folder previously browsed via the page snapback interface.

Although the page and search snapback interfaces are described incorporated with a browsing application, it is appreciated that the snapback interfaces may also be applied to other applications apparent to those with ordinary skill in the art. For example, according to one embodiment, snapback interfaces may be implemented in a slide presentation application, such as Keynote from Apple Computer, Inc. or Power Point from Microsoft Corporation, such that a user may directly snapback to a previous slide from a recorded location without having to go through the intermediate pages. Alternatively, the snapback interfaces may be implemented within a word processing application with browsing capability (e.g., a plugged-in application) to Internet, an electronic library, or an electronic dictionary, such that a user is able to snapback between an editing mode and browsing mode. For example, a user with a word processing application may need to access an electronic library or electronic dictionary while in an editing mode. After the user is in a browsing mode browsing the electronic library or dictionary, the user may activate a snapback functionality to snapback to the editing page, or vice versa. Within an electronic library or an electronic dictionary, the user may conduct a search and invoke the search result snapback interface to snapback between the search result and one or more hits. The electronic library or dictionary may be provided via the Internet by a third party vendor. In addition, the snapback interfaces are not limited to Internet applications, they may also be implemented locally, such as, for example, an Intranet within an organization or within a single computer. Other applications or environments may also employ the exemplary snapback interfaces described herein.

According to one embodiment, the recorded snapback locations may be maintained in a nonvolatile memory in the system, such as nonvolatile memory 206 of system 200 shown in FIG. 2. As a result, a subsequent execution of the application may "pick up" those snapback locations without having to initially access those pages. For example, a user initially launches a first instance of a browsing application to browse one or more pages and the first instance of the browsing application is terminated afterwards. During the browsing with the first instance of the browsing application, one or more snapback pages are recorded and may be stored in a nonvolatile memory, such as a hard disk or a system registry file. Subsequently, the user may wish to browse the same pages again by launching a second instance of the browsing application. The second instance of the browsing application may "pick up" the locations of those snapback pages, by retrieving the corresponding information from the memory, such as a system registry. As a result, the user may snapback to one or more of those snapback pages without having to access the page via a conventional method.

In addition, according another embodiment, multiple instances of a browsing application may share the snapback information regarding both page and search result snapback. For example, a user may launch a first instance of a browser to access some pages or search result pages which trigger the snapback functionalities. The snapback information is then stored in a nonvolatile memory, such as a hard disk or a system registry. Subsequently, the user may launch a second instance of the browser while the first instance is still running. The second instance of the browser may retrieve the snapback information from the corresponding memory (e.g., system registry) and may access the snapback pages recorded by the snapback functionality of the first instance of the browser. As a result, both the first and second instances of the browser share the same snapback information. Alternatively, the first and second instances of the browsers may exchange the snapback information via an inter-process API (application programming interface) at run-time.

Similarly, locations of search result pages may be recorded and maintained in a nonvolatile memory via the search result snapback interface. As a result, a user may snapback to previous recorded search result pages in subsequent instances of the browsing application without having to submit a same search request to a search facility again.

Furthermore, the locations of the snapback pages may be exported to or stored in a portable file (e.g., snapback configuration file), such that the snapback information may be exchangeable between applications or users. For example, a first user may access pages, record the locations of those pages, and store the locations in a portable snapback file. Subsequently, the first user may send (e.g., email) the portable snapback file to a second user. The second user may launch his/her browsing application to read the snapback information from the snapback file received from the first user and may access those snapback pages via the snapback interfaces. Other configurations may exist.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method performed by an application of a data processing system, the method comprising:

accessing a first document presentation other than a default initial document presentation based on an address displayed within an address field of a window, wherein the first document presentation is displayed within a display area of the window;

recording a first location of the first document presentation;

accessing and displaying in the display area of the window a sequence of intermediate document presentations originated from the first document presentation;

displaying a first snapback button associated with the address field;

conducting a search via a search facility based on one or more search keywords entered in a search field of the window;

displaying a search result in the display area of the window;

in response to a first input received via the first snapback button, without having to select from a menu of document presentations, directly retrieving and displaying the first document presentation from the first location without having to access the intermediate document presentations again; and displaying a second snapback button associated with the search field, wherein the second snapback button is used to directly redisplay the search result in the display area of the window.

2. The method of claim 1, further comprising removing the first snapback button from the first predetermined proximity of the address field when the first document presentation is redisplayed, wherein the first location is recorded when the first document presentation is accessed in response to an action selected from the group consisting of:
typing an address in an address field;
accessing a link from a document; and
selecting an item from a favorite list.

3. The method of claim 1, further comprising:
accessing and displaying a second intermediate document presentation in the display area of the window from the redisplayed first document presentation; and
redisplaying the first snapback button within a first predetermined proximity of the address field.

4. The method of claim 3, wherein the first snapback button is displayed within the first predetermined proximity of the address field, while the second snapback button is displayed within a second predetermined proximity of the search field, when the second intermediate document presentation is displayed in the display area of the window.

5. The method of claim 4, wherein the first snapback button is displayed within the address field and wherein the second snapback button is displayed within the search field.

6. The method of claim 1, further comprising:
accessing a second document presentation from the first document presentation; and
recording a second location of the second document presentation in response to a user request, wherein the recordation of the second location causes the first location to be unrecorded.

7. The method of claim 6, further comprising:
accessing one or more third document presentations from the second document presentation; and
in response to the first input, without having to select from a menu of document presentations, directly retrieving the second document presentation from the recorded second location.

8. The method of claim 1, wherein the first document presentation is accessed via a window, wherein the method further comprises:
receiving a search result from a search engine in response to a search request, the search result including a first and a second result pages;
displaying the first search result page in the window; and
recording a second location of the first search result page.

9. The method of claim 8, further comprising:
accessing a second document presentation from the first search result page;
in response to a second input, without having to select from a menu of document presentations, directly retrieving the first search result page from the recorded second location; and
redisplaying the first search result page in the window.

10. The method of claim 9, wherein after the first search result is redisplayed, the method further comprises:
in response to the first input, without having to select from a menu of document presentations, directly retrieving the first document presentation from the recorded first location; and
displaying the first document presentation in the window.

11. The method of claim 8, further comprising:
accessing the second search result page; and
recording a third location of the second search result page, wherein the recordation of the third location causes the second location of the first search result page to be unrecorded.

12. The method of claim 11, further comprising:
accessing a third document presentation other than the search result via the window;
in response to a second input, without having to select from a menu of document presentations, directly retrieving the second search result page from the recorded third location; and
displaying the second search result page in the window.

13. A machine-readable storage medium having machine instructions stored therein, which when executed, cause a machine to perform a method, the method comprising:
accessing a first document presentation other than a default initial document presentation based on an address displayed within an address field of a window, wherein the first document presentation is displayed within a display area of the window;
recording a first location of the first document presentation;
accessing and displaying in the display area of the window a sequence of intermediate document presentations originated from the first document presentation;
displaying a first snapback button associated with the address field;
conducting a search via a search facility based on one or more search keywords entered in a search field of the window;
displaying a search result in the display area of the window;
in response to a first input received via the first snapback button, without having to select from a menu of document presentations, directly retrieving and displaying the first document presentation from the first location without having to access the intermediate document presentations again; and
displaying a second snapback button associated with the search field, wherein the second snapback button is used to directly redisplay the search result in the display area of the window.

14. The machine-readable storage medium of claim 13, wherein the method further comprises:
accessing and displaying a second intermediate document presentation in the display area of the window from the redisplayed first document presentation; and
redisplaying the first snapback button within a first predetermined proximity of the address field.

15. The machine-readable storage medium of claim 14, wherein the first snapback button is displayed within the first predetermined proximity of the address field, while the second snapback button is displayed within a second predetermined proximity of the search field, when the second intermediate document presentation is displayed in the display area of the window.

16. The machine-readable storage medium of claim 15, wherein the first snapback button is displayed within the address field and wherein the second snapback button is displayed within the search field.

17. A data processing system, comprising:
a processor; and
a memory for storing instructions, which when executed from the memory, cause the processor to perform operations, including
accessing a first document presentation other than a default initial document presentation based on an address displayed within an address field of a window, wherein the first document presentation is displayed within a display area of the window, recording a first location of the first document presentation, accessing and displaying in the display area of the window a sequence of intermediate document presentations originated from the first document presentation, displaying a first snapback button associated with the address field, conducting a search via a search facility based on one or more search keywords entered in a search field of the window, displaying a search result in the display area of the window, in response to a first input received via the first snapback button, without having to select from a menu of document presentations, directly retrieving and displaying the first document presentation from the first location without having to access the intermediate document presentations again, and displaying a second snapback button associated with the search field, wherein the second snapback button is used to directly redisplay the search result in the display area of the window.

18. The system of claim 17, wherein the operations further comprise:

accessing and displaying a second intermediate document presentation in the display area of the window from the redisplayed first document presentation; and redisplaying the first snapback button within the first predetermined proximity of the address field.

19. The system of claim 18, wherein the first snapback button is displayed within a first predetermined proximity of the address field, while the second snapback button is displayed within a second predetermined proximity of the search field, when the second intermediate document presentation is displayed in the display area of the window.

20. The system of claim 19, wherein the first snapback button is displayed within the address field and wherein the second snapback button is displayed within the search field.

* * * * *

UNITED STATES PATENT AND TRADEMARK OFFICE
CERTIFICATE OF CORRECTION

| | | |
|---|---|---|
| PATENT NO. | : 7,823,054 B2 | Page 1 of 1 |
| APPLICATION NO. | : 11/644162 | |
| DATED | : October 26, 2010 | |
| INVENTOR(S) | : Forstall et al. | |

It is certified that error appears in the above-identified patent and that said Letters Patent is hereby corrected as shown below:

Title Page; item (54) and Col. 1, lines 1-4; in the title, please change to read:

--USER INTERFACE FOR ACCESSING PRESENTATIONS AND SEARCH RESULTS--

Signed and Sealed this
Fifth Day of April, 2011

David J. Kappos
*Director of the United States Patent and Trademark Office*